(12) United States Patent
Jun

(10) Patent No.: US 9,978,420 B2
(45) Date of Patent: May 22, 2018

(54) METHOD OF PERFORMING READ/WRITE PROCESS ON RECORDING MEDIUM, PARAMETER ADJUSTMENT METHOD, STORAGE DEVICE, COMPUTER SYSTEM, AND STORAGE MEDIUM EMPLOYING THE METHODS

(71) Applicant: Seagate Technology LLC, Cupertino, CA (US)

(72) Inventor: Walter Jun, Seoul (KR)

(73) Assignee: Seagate Technology LLC

( * ) Notice: Subject to any disclaimer, the term of this patent is extended or adjusted under 35 U.S.C. 154(b) by 1 day.

(21) Appl. No.: 15/339,397

(22) Filed: Oct. 31, 2016

(65) Prior Publication Data

US 2017/0047092 A1 Feb. 16, 2017

Related U.S. Application Data

(63) Continuation of application No. 13/240,554, filed on Sep. 22, 2011, now Pat. No. 9,508,382.

(30) Foreign Application Priority Data

Oct. 18, 2010 (KR) .......................... 10-2010-0101469

(51) Int. Cl.
*G11B 19/04* (2006.01)
*G11B 27/36* (2006.01)
(Continued)

(52) U.S. Cl.
CPC .... *G11B 20/1816* (2013.01); *G11B 20/00949* (2013.01); *G11B 20/1217* (2013.01);
(Continued)

(58) Field of Classification Search
CPC .......... G11B 7/00375; G11B 20/00123; G11B 20/0092; G11B 20/00963; G11B 20/025;
(Continued)

(56) References Cited

U.S. PATENT DOCUMENTS 5,341,359 A 8/1994 Birukawa et al.
5,995,463 A 11/1999 Sakashita
(Continued)

FOREIGN PATENT DOCUMENTS

JP 06243472 9/1994
JP 200367951 A * 8/2001
(Continued)

OTHER PUBLICATIONS

Jun, Walter; Final Office Action for U.S. Appl. No. 13/240,554, filed Sep. 22, 2011, dated May 22, 2014, 21 pgs.
(Continued)

*Primary Examiner* — Dionne H Pendleton
(74) *Attorney, Agent, or Firm* — Taylor English Duma LLP

(57) ABSTRACT

Methods, apparatuses and systems for detecting defective sectors on a recording medium, the method including calculating a servo gain for each servo sector of a track of a recording medium of a storage device; determining whether the servo gain of each servo sector exceeds a threshold value; and upon determining that the servo gain of a servo sector exceeds the threshold value, determining data sectors included in the servo sector to be defective sectors.

18 Claims, 23 Drawing Sheets

(51) Int. Cl.
*G11B 5/00* (2006.01)
*G11B 20/18* (2006.01)
*G11B 20/00* (2006.01)
*G11B 20/24* (2006.01)
*G11B 20/12* (2006.01)
*G11B 20/10* (2006.01)

(52) U.S. Cl.
CPC .......... *G11B 20/18* (2013.01); *G11B 20/1833* (2013.01); *G11B 20/24* (2013.01); *G11B 20/10027* (2013.01); *G11B 2020/1222* (2013.01); *G11B 2020/1232* (2013.01); *G11B 2020/1277* (2013.01); *G11B 2020/1279* (2013.01); *G11B 2020/1281* (2013.01); *G11B 2220/2516* (2013.01)

(58) Field of Classification Search
CPC .... G11B 2020/1222; G11B 2020/1232; G11B 2020/1277; G11B 2020/1281; G11B 20/10009; G11B 20/10027; G11B 20/10388; G11B 20/1217; G11B 20/18; G11B 20/1816; G11B 20/1833; G11B 2220/2516; G11B 5/09; G11B 5/5534; G11B 5/59622
See application file for complete search history.

(56) References Cited

U.S. PATENT DOCUMENTS

| | | | |
|---|---|---|---|
| 6,034,831 A * | 3/2000 | Dobbek | G11B 19/04 360/31 |
| 6,205,099 B1 | 3/2001 | Sasaki et al. | |
| 6,223,303 B1 | 4/2001 | Billings et al. | |
| 6,480,445 B1 | 11/2002 | Yun et al. | |
| 7,047,438 B2 | 5/2006 | Smith et al. | |
| 7,215,619 B1 | 5/2007 | Van Den Enden | |
| 7,546,495 B2 | 6/2009 | Brondijk | |
| 7,583,461 B2 | 9/2009 | Kudoh et al. | |
| 7,617,419 B2 | 11/2009 | Park | |
| 8,018,671 B2 | 9/2011 | Kuan et al. | |
| 8,223,448 B1 * | 7/2012 | Haw | G11B 5/09 360/46 |
| 8,270,274 B2 * | 9/2012 | Ueno | G11B 20/1816 369/53.17 |
| 8,345,367 B1 | 1/2013 | Tharumalingam | |
| 8,493,681 B1 | 7/2013 | Selvaraj | |
| 9,368,152 B1 | 6/2016 | Park | |
| 9,508,382 B2 | 11/2016 | Jun | |
| 2002/0122266 A1 | 9/2002 | Andoh et al. | |
| 2002/0176195 A1 * | 11/2002 | Fung | G11B 5/012 360/53 |
| 2002/0191319 A1 | 12/2002 | Liew et al. | |
| 2003/0048707 A1 | 3/2003 | Ono | |
| 2003/0048731 A1 | 3/2003 | Ozaki | |
| 2005/0138464 A1 | 6/2005 | Chong et al. | |
| 2005/0162947 A1 | 7/2005 | Kim et al. | |
| 2006/0133234 A1 * | 6/2006 | Inada | G11B 7/0941 369/44.29 |
| 2006/0230328 A1 | 10/2006 | Blacquiere et al. | |
| 2007/0247991 A1 * | 10/2007 | Nakagawa | G11B 20/1883 369/53.17 |
| 2009/0195917 A1 | 8/2009 | Aso et al. | |
| 2010/0053799 A1 * | 3/2010 | Kang | G11B 5/59688 360/77.04 |
| 2010/0097903 A1 | 4/2010 | Kimura et al. | |
| 2011/0194205 A1 * | 8/2011 | Kim | G11B 20/1816 360/53 |
| 2012/0092975 A1 | 4/2012 | Jun | |
| 2013/0064060 A1 | 3/2013 | Oberg | |
| 2016/0260457 A1 | 9/2016 | Park | |

FOREIGN PATENT DOCUMENTS

| | | |
|---|---|---|
| JP | 2009181672 | 8/2009 |
| KR | 1020040045644 | 6/2004 |

OTHER PUBLICATIONS

Jun, Walter; Non-Final Office Action for U.S. Appl. No. 13/240,554, filed Sep. 22, 2011, dated Nov. 5, 2013; 20 pgs.
Jun, Walter; Non-Final Office Action for U.S. Appl. No. 13/240,554, filed Sep. 22, 2011, dated Jan. 15, 2016, 16 pgs.
Jun, Walter; Non-Final Office Action for U.S. Appl. No. 13/240,554, filed Sep. 22, 2011, dated Dec. 3, 2014, 24 pgs.
Jun, Walter; Non-Final Office Action for U.S. Appl. No. 13/240,554, filed Sep. 22, 2011, dated Jul. 1, 2015, 18 pgs.
Jun, Walter; Notice of Allowance for U.S. Appl. No. 13/240,554, filed Sep. 22, 2011, dated Jul. 25, 2016, 9 pgs.
Jun, Walter; Restriction Requirement for U.S. Appl. No. 13/240,554, filed Sep. 22, 2011, dated Jun. 20, 2013; 7 pgs.
Jun, Walter; U.S. Patent Application Entitled: Method of Performing Read/Write Process on Recording Medium, Parameter Adjustment Method, Storage Device, Computer System, and Storage Medium Employing the Methods, U.S. Appl. No. 13/240,554, filed.
Jun, Walter; Issue Notification for U.S. Appl. No. 13/240,554, filed Sep. 22, 2011, dated Nov. 9, 2016, 1 pg.
Park, MoonChol; Final Office Action for U.S. Appl. No. 15/157,054, filed May 17, 2016, dated Dec. 9, 2016, 17 pgs.

* cited by examiner

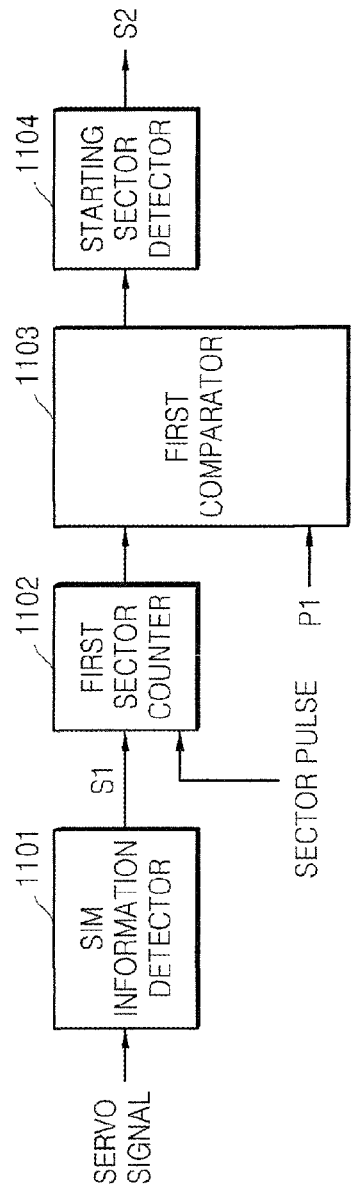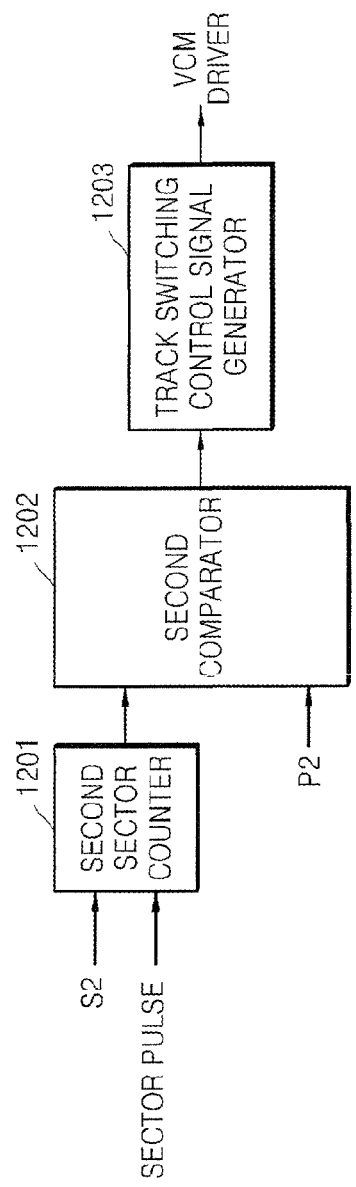

METHOD OF PERFORMING READ/WRITE PROCESS ON RECORDING MEDIUM, PARAMETER ADJUSTMENT METHOD, STORAGE DEVICE, COMPUTER SYSTEM, AND STORAGE MEDIUM EMPLOYING THE METHODS

CROSS-REFERENCE TO RELATED APPLICATIONS

This application is a continuation of U.S. patent application Ser. No. 13/240,554, filed Sep. 22, 2011, which claims priority from Korean Patent Application No. 10-2010-0101469, filed on Oct. 18, 2010, in the Korean Intellectual Property Office, the disclosures of which are incorporated herein in their entirety by this reference.

BACKGROUND

Methods and apparatuses consistent with exemplary embodiments relate to performing a read/write process on a recording medium, and more particularly, to performing a read/write process on a defective recording medium.

A disc drive, which is one type of storage device, writes data to a recording medium or reads data from the recording medium according to a command given from a host device, thereby helping operate a computer system. As disc drives have been developed to have high-capacity and high-density and to be thin and small, a defect is highly likely to occur in a recording medium. Accordingly, there is a need to develop a method of effectively performing a read/write process on a defective recording medium.

SUMMARY

According to one or more aspects of an exemplary embodiment, there is provided a method of performing a read/write process on a recording medium by adjusting parameters related to the read/write process according to a defect occurring in the recording medium.

One or more aspects of an exemplary embodiment also provide an apparatus for performing the read/write process on a recording medium by adjusting parameters related to the read/write process according to a defect occurring in the recording medium.

One or more aspects of an exemplary embodiment also provide a method of adjusting parameters related to the read/write process in a network according to a defect occurring in a recording medium.

One or more aspects of an exemplary embodiment also provide a computer system for performing the read/write process on a recording medium by adjusting parameters related to the read/write process according to a defect occurring in the recording medium.

One or more aspects of an exemplary embodiment also provide a storage medium having recorded thereon a program code for executing a method of performing the read/write process by adjusting parameters related to the read/write process according to a defect occurring in the recording medium.

According to an aspect of an exemplary embodiment, there is provided a method of performing a read/write process on a recording medium, the method including determining an area of a recording medium, in which a defect, the value of which is greater than an initially set threshold, occurs in units of tracks, to be a massive defective area; adjusting a first parameter representing a logical track length, based on the size of a defect occurring in each track included in the massive defective area; and performing the read/write process by using the adjusted first parameter.

The initially set threshold may be set to a track length corresponding to a time needed for performing track switching on the recording medium.

The initially set threshold may be set to the total number of servo sectors or data sectors corresponding to a time needed for performing track switching on the recording medium.

The determining of the massive defective area may include detecting data sectors having a defect in the recording medium; and determining a region of the recording medium, in which a defect, the value of which is greater than the initially set threshold, occurs in data sectors of each track in units of tracks, to be a massive defective area, according to a distribution of the data sectors having a defect.

The massive defective area may be determined to be an area, in which a defect, the value of which is greater than the initially set threshold, occurs in at least one adjacent track.

The massive defective area may be determined to be an area, in which a defect, the value of which is greater than the initially set threshold, occurs in at least one adjacent track and a percentage of data sectors having the defect and being located facing each other on adjacent tracks is equal to or greater than an initially set percentage.

The detecting of data sectors having a defect may include detecting a servo gain of each servo sector while reproducing a servo signal recorded on each track; and determining data sectors included in a servo sector, the servo gain of which is greater than an initially set first threshold, to be defective sectors.

The servo gain of each servo sector may be detected by calculating an average of servo gains produced in a region to which servo information is written, in units of servo sectors.

The detecting of data sectors having a defect may include detecting a servo gain of each servo sector while reproducing a servo signal written to each track; calculating an average of servo gains of servo sectors included in each track; calculating a second threshold by multiplying the average by a proportional constant that is greater than '0' and less than '1'; and determining data sectors included in a servo sector, the servo gain of which is greater than the second threshold, to be defective sectors.

The detecting of data sectors having a defect may include writing test data to the recording medium; reading the test data from the recording medium, and counting a total number of error correcting code (ECC) symbols that are error-corrected in units of data sectors; and if the total number of error-corrected ECC symbols is greater than an initially set third threshold, determining a corresponding data sector to be a defective sector.

The massive defective area may be determined in units of data zones of the recording medium.

A length of the massive defective area in each track, which is included in the massive defective area, in a track-wise direction may be determined to be the same for all data zones.

A width of the massive defective area in a disc radius-wise direction may be determined to be expanded so as to be equal to a width of a data zone including the massive defective area.

A width of the massive defective area in a disc radius-wise direction may be determined to be expanded to be equal to a width of a data zone including the massive defective area when a ratio of the width of the massive defective area to a width of a data zone including the massive defective area is greater than an initially set percentage, and may be determined to cover only tracks actually having a defect when the ratio is less than or equal to the initially set percentage.

The first parameter may be adjusted to be a value obtained by subtracting a length of the massive defective area in a track-wise direction from a physical track length.

The first parameter may be adjusted to be a value obtained by subtracting a total number of data sectors included in the massive defective area of one track from a total number of data sectors per track.

The method may further include determining a second parameter representing a location of a starting sector in each track included in the massive defective area.

The second parameter may be determined to be a value representing a location of a first data sector following the massive defective area.

The second parameter may be determined to be the total number of data sectors present between a location where servo index mark information is detected and a location of a first data sector following the massive defective area.

During the read/write process, track switching may be performed at a start of the massive defective area by using the second parameter determined in the massive defective area and the first parameter.

A logical track length may be adjusted in such a manner that a logical block address is not assigned to data sectors included in the massive defective area.

According to another aspect of an exemplary embodiment, there is provided a method of performing a read/write process on a recording medium, the method including adjusting a first parameter representing a logical track length, based on a size of a defect occurring in each track in a massive defective area of a disc, wherein the massive defective area denotes an area of the disc, in which a defect, the value of which is greater than an initially set threshold, occurs in units of tracks; determining a second parameter representing location of a first data sector following the massive defective area in a track including the massive defective area; and performing the read/write process by using the first parameter and the second parameter. During the performing of the read/write process, a signal indicating the location of a starting sector is generated when a total number of sector pulse signals generated starting from a point of time when servo index mark information is detected from a track included in the massive defective area is equal to the second parameter, and a signal indicating the location of a last sector is generated when a total number of sector pulse signals generated starting from a point of time when the signal indicating the location of the starting sector is equal to the first parameter.

During the performing of the read/write process, the last sector may be detected based on the signal indicating the location of the last sector, the last sector may be accessed, and a track switching control signal may be generated.

During the performing of the read/write process, voice coil motor driving current may be generated to move a head based on the track switching control signal.

According to another aspect of an exemplary embodiment, there is provided a storage device including a recording medium including a plurality of tracks for storing data; a media interface for writing information to, or reading information from, the recording medium by accessing the recording medium; and a processor for controlling the media interface to write data to, or read data from, a target track of the recording medium. If a massive defective area in which a defect, the value of which is greater than an initially set threshold, occurs in units of tracks, is present in the recording medium, then the processor adjusts an initially set first parameter representing a logical track length, based on the size of a defect occurring in each track of the massive defective area.

The initially set threshold may be set to a track length corresponding to a time needed to perform track switching on the recording medium.

The processor may include a defective sector detector for determining a defective sector based on servo gains produced in an automatic gain control circuit in a section in which a servo signal recorded on each track is reproduced.

The defective sector detector may include a servo gain calculator for calculating a servo gain of each servo sector by receiving the servo gains produced in the automatic gain control circuit in the section in which the servo signal recorded on each track is reproduced; and a defective sector determination unit for determining data sectors included in a servo sector, the servo gain of which is greater than the initially set first threshold, to be defective sectors.

The defective sector detector may include a first servo gain calculator for calculating a servo gain of each servo sector by receiving the servo gains produced in the automatic gain control circuit in the section in which the servo signal recorded on each track is reproduced; a buffer for storing the calculated servo gain of each servo sector; a second servo gain calculator for calculating an average servo gain of each track by calculating an average of the servo gains of the servo sectors in units of tracks; a threshold value calculator for calculating a second threshold by multiplying the average servo gain of each track by a proportional constant which is greater than '0' and less than '1'; and a defective sector determination unit for determining data sectors included in a servo sector, the servo gain of which is greater than the second threshold to be defective sectors, from among the stored servo gains in the buffer.

The processor may include an error correcting code (ECC) processor for performing error correction by using error correcting code (ECC) contained in information read from the recording medium having recorded thereon the test data; an ECC symbol number calculator for counting a total number of ECC symbols that are error-corrected by the ECC processor in units of data sectors; and a defective sector determination unit for determining a corresponding data sector to be a defective sector when the total number of error-corrected ECC symbols is greater than an initially set third threshold.

The processor may determine a length of the massive defective area in each track, which is included in the massive defective area, in a track-wise direction to be the same for all data zones.

The processor may adjust the first parameter to be a value obtained by subtracting a length of the massive defective area in a track-wise direction from a physical track length.

The processor may adjust the first parameter to be a value obtained by subtracting a total number of data sectors included in the massive defective area of one track from a total number of data sectors of each track.

The processor may adjust the first parameter to be the same for all tracks included in the massive defective area.

The processor may determine a second parameter representing a location of a starting track in each track included in the massive defective area to be the same for all tracks included in the massive defective area.

The processor may determine a second parameter related to each track included in the massive defective area to represent a location of a first data sector following the massive defective area.

The processor may determine a second parameter related to each track included in the massive defective area to be a total number of data sectors present between a location where servo index mark information is detected and the location of the first data sector following the massive defective area.

The processor may store the first parameter in the recording medium or a nonvolatile memory included in the storage device.

The processor may store a second parameter, which represents a location of a starting track in each track included in the massive defective area, in a nonvolatile memory included in the storage device.

The processor may include a servo index mark information detector for producing a first signal when servo index mark information is detected from servo information that is reproduced; a first sector counter which is reset when the first signal is input thereto, counts the total number of input sector pulse signals, and outputs a result of the counting; a first comparator for comparing a second parameter representing a total number of sectors present between a location where servo index mark information is detected and the end of the massive defective area with the result of the counting; and a starting sector detector for producing a second signal when the second parameter is the same as the result of the counting, The processor may control a location of a starting sector of each track to be detected based on the second signal, and a read/write process to be performed according to the location of the starting sector of each track.

The processor may further include a second sector counter which is reset when the second signal is input thereto, counts the total number of input sector pulse signals, and outputs a result of the counting; a second comparator for comparing a value output from the second sector counter with the first parameter; and a track switching control signal generator for producing a track switching control signal at the end of a corresponding sector when the value output from the second sector counter is the same as the first parameter.

The processor may adjust a logical track length in such a manner that a logical block address is not assigned to data sectors included in the massive defective area.

According to another aspect of an exemplary embodiment, there is provided a computer system including a host device for generating a command for operating a storage device connected to the host device; and the storage device for writing information received from the host device to a recording medium, or reading information from the recording medium and transmitting the read information to the host device, based on the command given from the host device. If a massive defective area in which a defect, the value of which is greater than an initially set threshold, occurs in units of tracks is present in the recording medium, then the storage device adjusts a first parameter representing a logical track length, based on the size of a defect of each track included in the massive defective area.

The storage device may adjust the first parameter to be a value obtained by subtracting a total number of data sectors included in the massive defective area of one track from a total number of data sectors of each track.

The storage device may determine a second parameter representing a location of a starting sector in each track included in the massive defective area to be a value representing a location of a first data sector following the massive defective area.

If a read/write process is performed on a track included in the massive defective area, then the storage device may perform track switching at a start of the massive defective area by using the first parameter and a second parameter representing a location of a starting sector in each track included in the massive defective area.

According to another aspect of an exemplary embodiment, there is provided a method of adjusting parameters, the method including downloading a program for managing a massive defect from a terminal connected to a network; and executing the program in a storage device. The program executes a task, in which a region of a recording medium, in which a defect, the value of which is greater than an initially set threshold occurs in units of tracks to be a massive defective area by performing defect inspection on the recording medium in the storage device, and a first parameter representing a logical track length is adjusted based on the size of a defect of each track included in the massive defective area.

The program may execute a task, in which the first parameter is adjusted to be a value obtained by subtracting a total number of data sectors included in the massive defective area of one track from a total number of data sectors of each track.

The program may execute a task, in which a second parameter representing a location of a starting sector in each track included in the massive defective area is determined to be a value representing a location of a first data sector following the massive defective area.

According to another aspect of an exemplary embodiment, there is provided a storage medium having recorded thereon computer program codes for executing the methods described above.

BRIEF DESCRIPTION OF THE DRAWINGS

Exemplary embodiments will be more clearly understood from the following detailed description taken in conjunction with the accompanying drawings, in which:

FIG. 11 is a block diagram of a starting sector detection circuit according to an exemplary embodiment;

FIG. 12 is a block diagram of a track switching control circuit according to an exemplary embodiment;

DETAILED DESCRIPTION OF EXEMPLARY EMBODIMENTS

Figure 1:
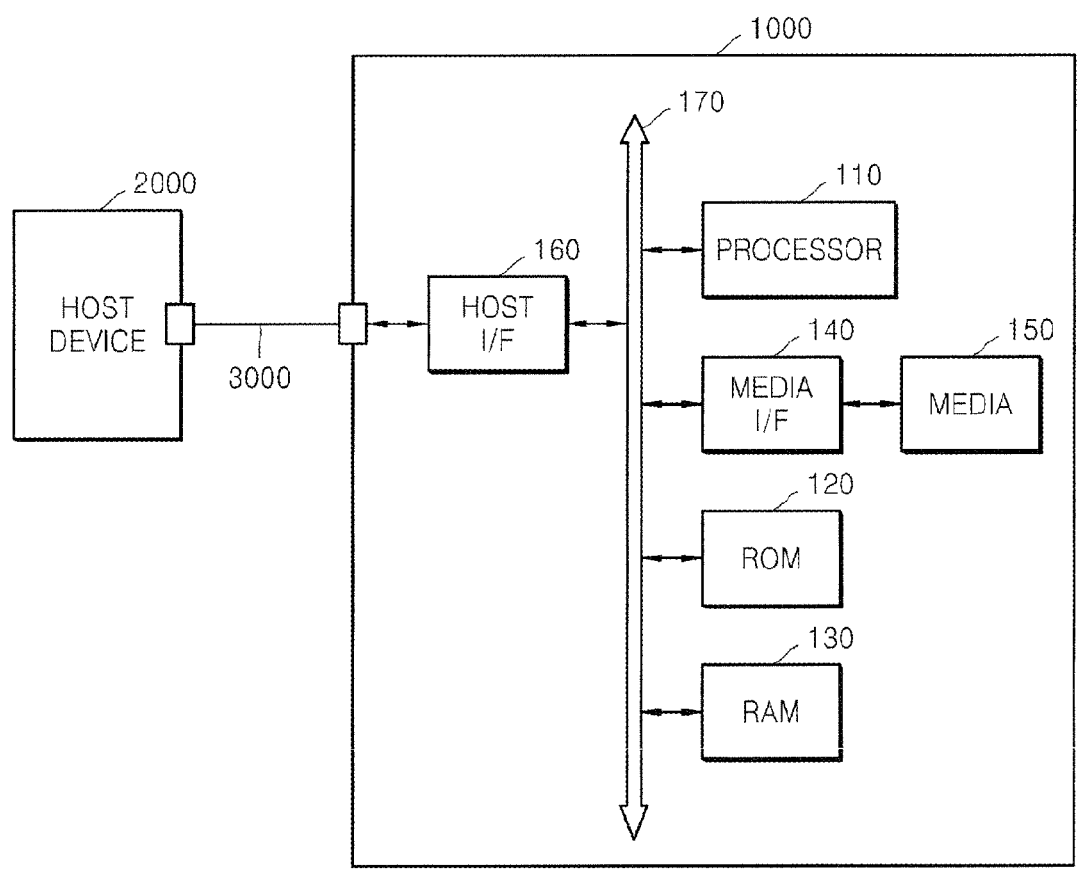
FIG. 1 is a block diagram of a computer system according to an exemplary embodiment.

Hereinafter, exemplary embodiments will be described in detail with reference to the accompanying drawings. While exemplary embodiments are described herein, they should not be construed as being limited to the exemplary embodiments set forth herein. Rather, these exemplary embodiments are provided so that this disclosure will be thorough and complete. In the drawings, the thickness of layers and areas may be exaggerated for clarity. The same reference numerals represent the same elements throughout the drawings.

Referring to FIG. 1, a computer system according to an exemplary embodiment includes a storage device 1000, a host device 2000, and a connector 3000. Specifically, the storage device 1000 includes a processor 110, a read-only memory (ROM) 120, a random access memory (RAM) 130, a media interface (I/F) 140, a media unit 150, a host I/F 160, and a bus 170.

The host device 2000 performs a process of generating a command for operating the storage device 1000, transmitting the command to the storage device 1000 via the connector 3000, and then transmitting data to, or receiving data from, the storage device 1000 according to the command.

The connector 3000 electrically connects an interface port of the host device 2000 and an interface port of the storage device 1000 to each other. Although not shown, the connector 3000 may include a data connector and a power connector. For example, when a Serial Advanced Technology Attachment (SATA) interface is used, the connector 3000 may include a 7-pin SATA data connector and a 15-pin SATA power connector.

According to the SATA standards, an eleventh pin port of the 15-pin SATA power connector is defined to be optionally used for staggered spin-up (SSU). The SSU is a function of sequentially starting a plurality of disc drives to be switched to a standby mode during powering 'on' of a host device when several disc drives are connected to the host device.

First, elements of the storage device 1000 will be described.

The processor 110 interprets a command and controls the elements of the storage device 1000 according to a result of the interpreting. The processor 110 includes a code object management unit (not shown), and loads a code object stored in the media unit 150 by using the code object management unit. The processor 110 may load code objects for performing a method of performing a read/write process on a recording medium as illustrated in the flowcharts of FIGS. 13, 14, 15, 16, 17 and 18 and a method of adjusting parameters of a storage device as illustrated in the flowchart of FIG. 33, to the RAM 130.

Figure 33:
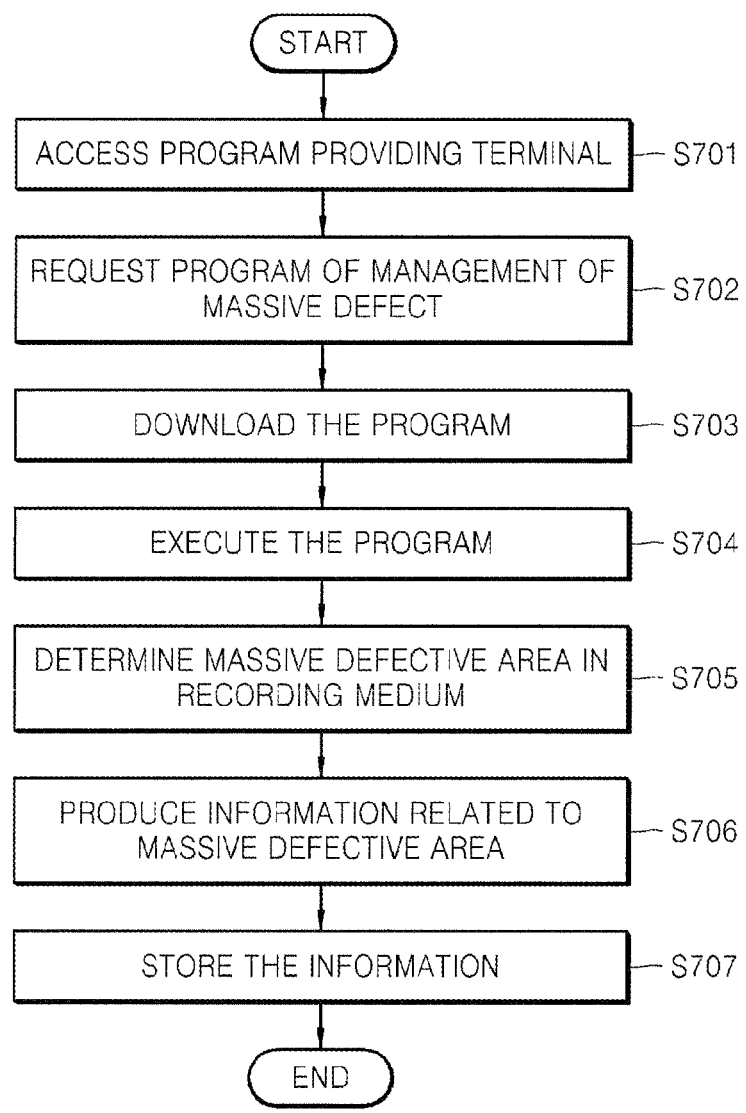
FIG. 33 is a flowchart illustrating a method of adjusting parameters of a storage device, according to an exemplary embodiment.

Then, the processor 110 performs tasks related to the method of performing the read/write process on a recording medium as illustrated in the flowcharts of FIGS. 13, 14, 15, 16, 17 and 18 and the method of adjusting parameters as illustrated in the flowchart of FIG. 33, by using the code objects loaded to the RAM 130. These methods performed by the processor 110 will be described later in detail with reference to FIGS. 13, 14, 15, 16, 17, 18 and FIG. 33.

The ROM 120 stores program codes and data needed to operate the storage device 1000.

Program codes and data stored in the ROM 120 or the media unit 150 are loaded to the RAM 130 under control of the processor 110.

The media unit 150 may include a disc or a non-volatile semiconductor memory device as a main storage medium of the storage device 1000. The storage device 1000 may include, for example, a disc drive. A head disc assembly 100 that includes a disc and a head in a disc drive, according to an exemplary embodiment, is particularly illustrated in FIG. 3.

Figure 3:
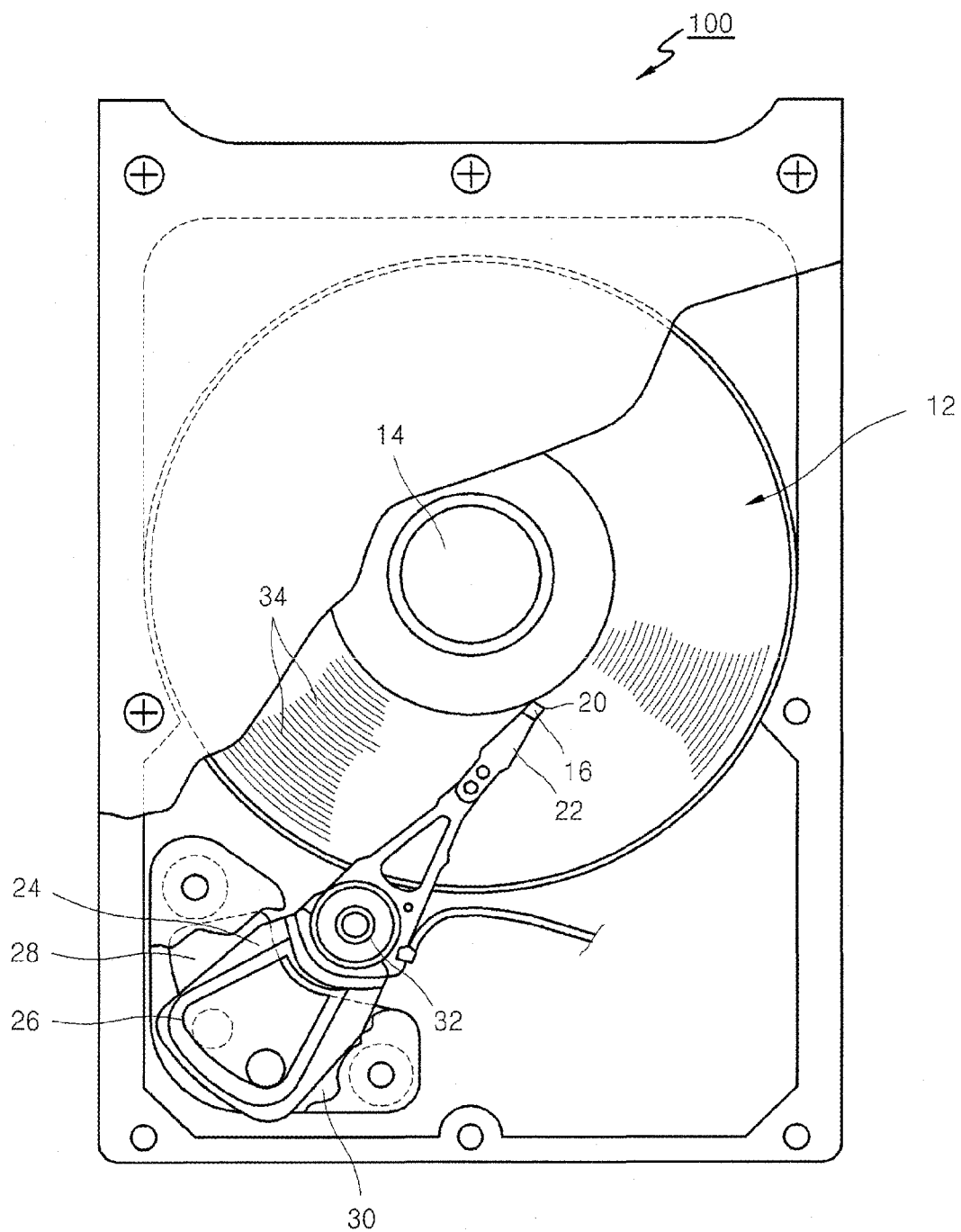
FIG. 3 is a plan view of a head disc assembly of a disc drive according to an exemplary embodiment.

Referring to FIG. 3, the head disc assembly 100 includes at least one disc 12 that is rotated by a spindle motor 14. The head disc assembly 100 also includes a head 16 located adjacent to a surface of the at least one disc 12.

The head 16 may sense and magnetize a magnetic field of the at least one disc 12 so as to read data from, or write data to, the at least one disc 12 when the at least one disc 12 is rotating. In general, the head 16 is coupled to the surface of the at least one disc 12. Although FIG. 3 illustrates one head, i.e., the head 16, it should be understood that the head 16 consists of two separated heads, i.e., a write head that magnetizes the at least one disc 12 and a read head that senses the magnetic field of the at least one disc 12. The read head may include a magneto-resistive (MR) device. The head 16 is also referred to as a magnetic head or a transducer.

The head 16 may be united with a slider 20. The slider 20 is constructed to generate an air bearing between the head 16 and the surface of the at least one disc 12. The slider 20 is coupled to a head gimbal assembly 22. The head gimbal assembly 22 is attached to an actuator arm 24 having a voice coil 26. The voice coil 26 is located adjacent to a magnetic assembly 28 so as to define a voice coil motor (VCM) 30. Current supplied to the voice coil 26 generates torque that allows the actuator arm 24 to pivot about a bearing assembly 32. The rotation of the actuator arm 24 moves the head 16 across the surface of the at least one disc 12.

In general, information is stored in annular tracks 34 of the at least one disc 12. Each of the annular tracks 34 includes a plurality of sectors. An exemplary sector construction of each of the annular tracks 34 is illustrated in FIG. 5.

Figure 5:
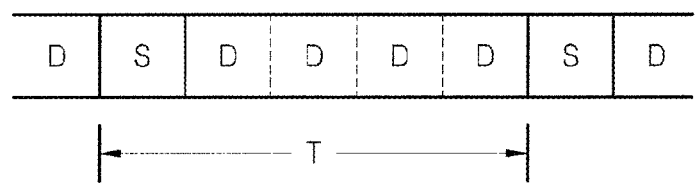
FIG. 5 is a diagram illustrating a sector construction of each track of a disc which is a recording medium, according to an exemplary embodiment.

Referring to FIG. 5, a servo sector section T may include a servo information area S and a data area. The data area may consist of a plurality of data sectors D or may consist of only one data sector D. In the servo information area S, signals as illustrated in FIG. 6 may be recorded.

Figure 6:
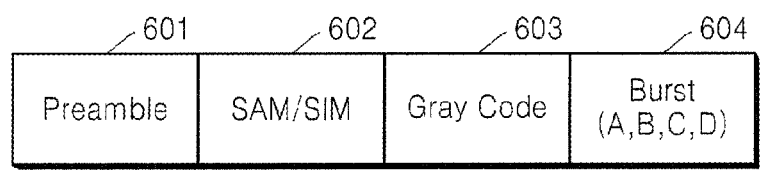
FIG. 6 is a diagram illustrating the structure of a servo information area illustrated in FIG. 5, according to an exemplary embodiment.

Referring to FIG. 6, in the servo information area S, a preamble signal 601, a servo synchronization indication signal 602, a gray code 603, and a burst signal 604 are written.

The preamble signal 101 provides clock synchronization during reading of servo information, and provides a timing margin by forming a gap before a servo sector. The preamble signal 101 is used to determine a gain of an automatic gain control (AGC) circuit.

The servo synchronization indication signal 602 includes a servo address mark (SAM) and a servo index mark (SIM). The SAM is a signal indicating the start of a servo sector, and the SIM is a signal indicating the start of a first servo sector in a track.

The gray code 603 provides track information. The burst signal 604 is used to control the head 16 to follow a middle part of the annular tracks 34. For example, the burst signal 604 includes four burst patterns A, B, C, and D. A position error signal for tracking control is generated from a combination of the four burst patterns A, B, C, and D.

A logical block address (LBA) is assigned to a writable area of the at least one disc 12. In the disc drive, the writable area of the at least one disc 12 is assigned by converting the LBA into cylinder/head/sector information. The at least one disc 12 is divided into a maintenance cylinder area that a user cannot access and a user data area that the user can access. The maintenance cylinder area is also referred to as a system area. Various information needed to control the disc drive is stored in the maintenance cylinder area. Also, information needed to perform the read/write process on a recording medium and a method of adjusting parameters of a storage device according to an exemplary embodiment, is stored in the maintenance cylinder area. Also, information regarding a massive defective area is stored in the maintenance cylinder area. The information regarding the massive defective area includes parameter information regarding the location of a sector #0 that is a starting sector in a track included in the massive defective area, and parameter information indicating an adjusted logical track length in the massive defective area. The information regarding the massive defective area further includes information indicating the location of the massive defective area of the recording medium.

The head 16 is moved across the surface of the at least one disc 12 to read data from, or write data to, a target track. The at least one disc 12 may store a plurality of code objects for performing various operations in the disc drive. For example, the at least one disc 12 may store a code object for performing an MP3 player function, a code object for navigation, and a code object for playing various video games.

Referring back to FIG. 1, the media I/F 140 allows the processor 110 to access the media unit 150 to write information to, or to read information from, the media unit 150. When the media I/F 140 is included in a storage device embodied as a disc drive, the media I/F 140 includes a servo circuit for controlling the head disc assembly 100 and a read/write channel circuit for performing signal processing so as to perform the read/write process.

The host interface 160 is used to transmit data to, or receive data from, the host device 2000, such as a personal computer (PC) or a mobile device. Various types of interfaces, such as a SATA interface, a Parallel Advanced Technology Attachment (PATA) interface, and a Universal Serial Bus (USB) interface, may be used as the host interface 160.

The bus 170 allows exchange of information among the constitutional elements of the storage device 1000.

A software operating system of a hard disc drive (HDD), which is an example of the storage device 1000, will now be described with reference to FIG. 2.

Figure 2:
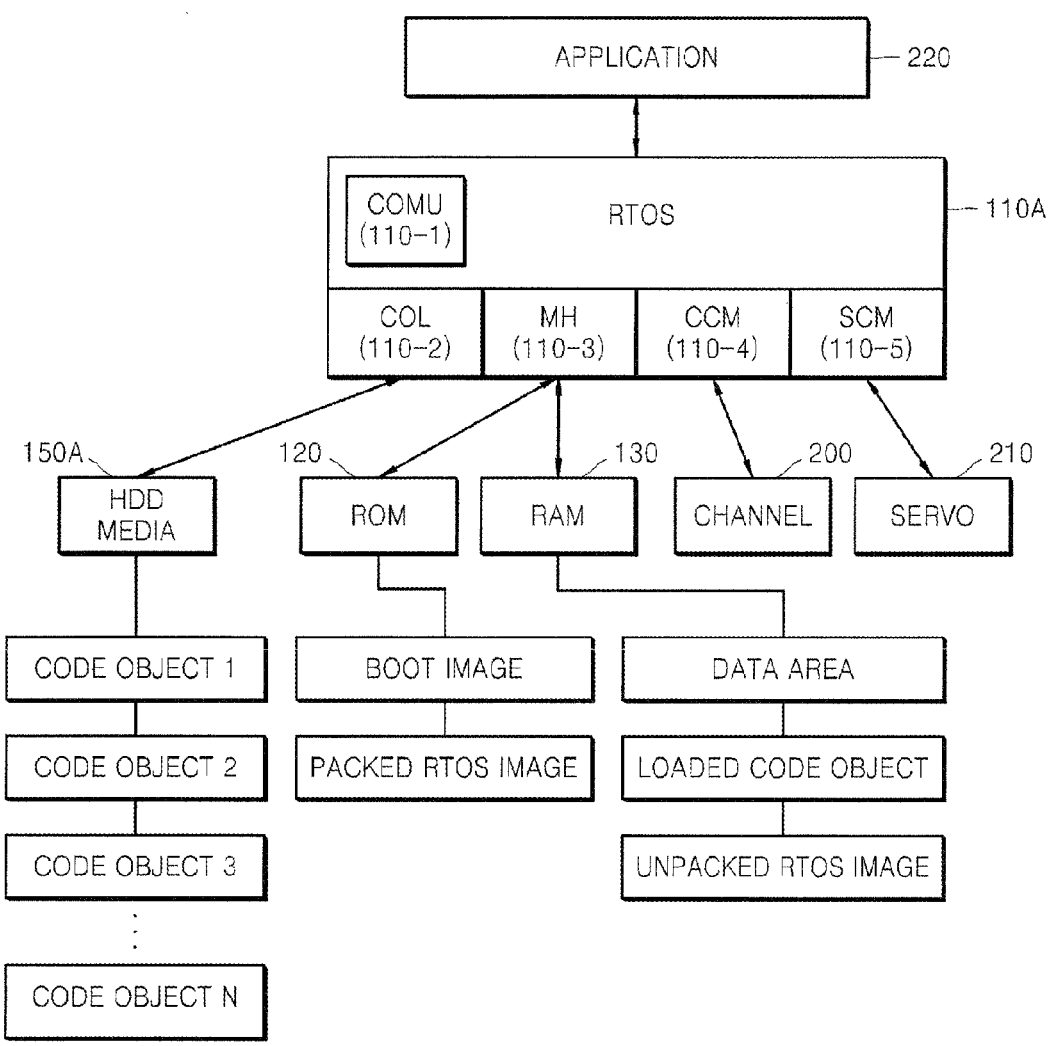
FIG. 2 illustrates a software operating system of a storage device included in the computer system of FIG. 1, according to an exemplary embodiment.

Referring to FIG. 2, an HDD media unit 150A, e.g., a disc, stores a plurality of code objects 1 to N.

A ROM 120 stores a boot image and a packed Real-Time Operating System (RTOS) image.

The plurality of code objects 1 to N stored in the HDD media unit 150A may include not only code objects for operating the HDD but also code objects related to various functions that may be expanded to the HDD. In particular, code objects for performing the read/write process on a recording medium according to an exemplary embodiment illustrated in FIGS. 13, 14, 15, 16, 17 and 18 and code objects for performing a method of adjusting parameters of a storage device according to an exemplary embodiment illustrated in FIG. 33, may be stored in the HDD media unit 150A. However, exemplary embodiments are not limited thereto and these code objects may be stored in the ROM 120 instead of the HDD media unit 150A. Furthermore, code objects for performing other various functions, such as an MP3 player function, a navigation function, and a video game function, may be stored in the HDD media unit 150A.

During booting, the boot image is read from the ROM 120 and an unpacked RTOS image is loaded to the RAM 130. Also, code objects that are stored in the HDD media unit 150A and that are needed to perform a host interface are loaded to the RAM 130. A data area is assigned to the RAM 130 so as to store data.

In order to perform the read/write process, circuits for signal processing are installed in a channel circuit 200 and circuits for controlling the head disc assembly 100 of FIG. 3 are included in a servo circuit 210.

An RTOS 110A is a real-time multi-program operating system using a disc. In the RTOS 110A, real-time multiplexing is performed in a foreground routine that has high priority and batch processing is performed in a background routine that has low priority according to a task. Also, the RTOS 110A loads a code object to, or unloads a code object from, the HDD media unit 105A.

The RTOS 110A performs a task according to a given command by managing a code object management unit (COMU) 110-1, a code object loader (COL) 110-2, a memory handler (MH) 110-3, a channel control module (CCM) 110-4, and a servo control module (SCM) 110-5. The RTOS 110A further manages an application program 220.

In detail, the RTOS 110A loads code objects for controlling the HDD to the RAM 130 during booting of the HDD. Thus, after the booting of the HDD, the HDD may be operated by using the code objects loaded to the RAM 130.

The COMU 110-1 stores location information of the code objects recorded, transforms a virtual address into an actual address, and performs bus arbitration. Also, the COMU 110-1 stores information regarding priorities of tasks that are running, and manages task control block (TCB) information and stack information needed to perform a task corresponding to a code object.

The COL 110-2 loads the code objects stored in the HDD media unit 150A to the RAM 130 or unloads the code objects stored in the RAM 130 to the HDD media unit 150A by using the COMU 110-1. Thus, the COL 110-2 may load the code objects for performing the methods illustrated in FIGS. 13, 14, 15, 16, 17, 18 and 33, which are stored in the HDD media unit 150A, to the RAM 130.

The RTOS 110A may perform the methods illustrated in FIGS. 13, 14, 15, 16, 17, 18 and 33, which will be described in detail later, by using the code objects loaded to the RAM 130.

The MH 110-3 writes data to, or reads data from the ROM 120 or the RAM 130.

The CCM 110-4 performs channel control required to perform signal processing for the read/write process. The SCM 110-5 performs servo control including control of the head disc assembly 100 so as to perform the read/write process.

Figure 4:
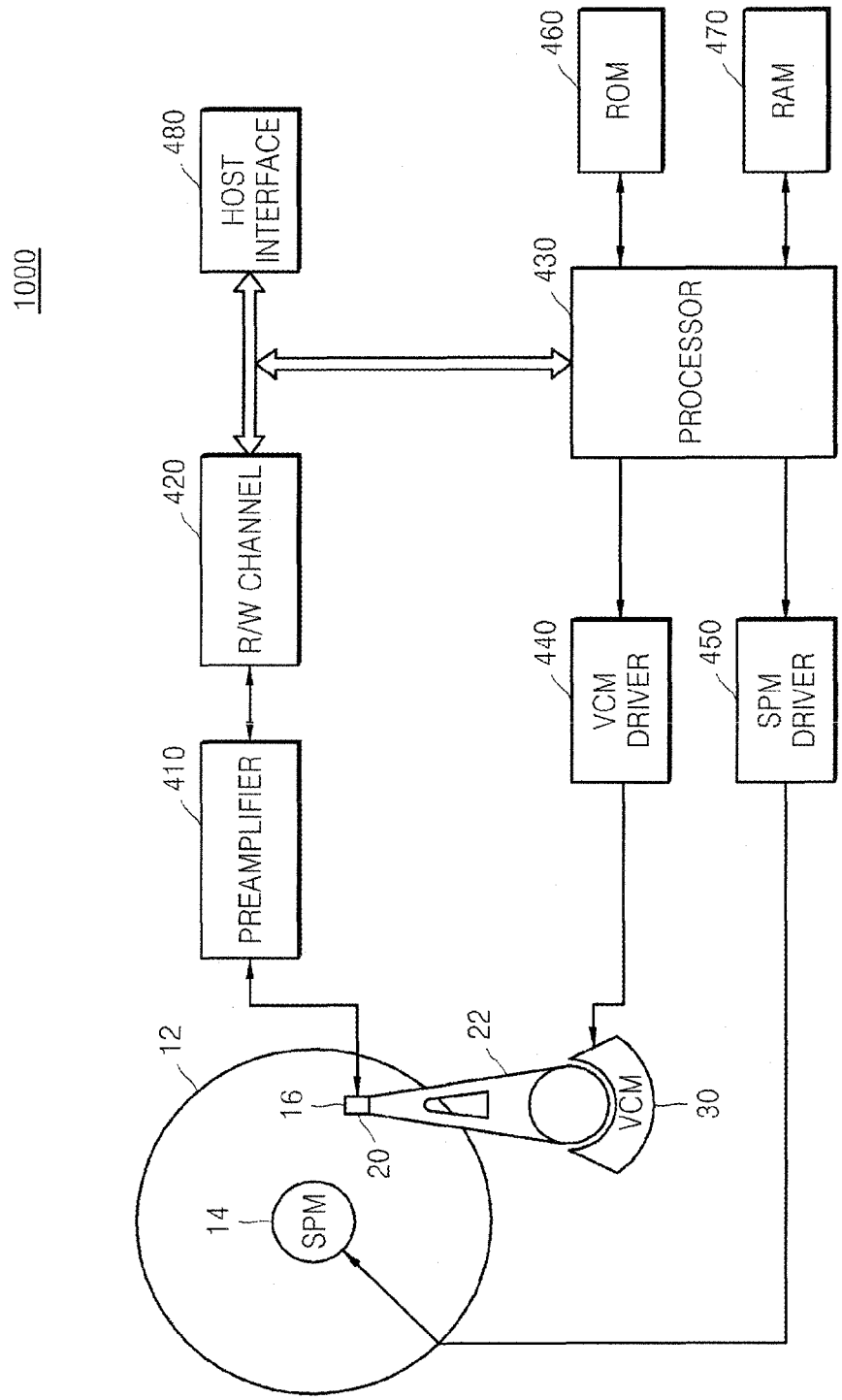
FIG. 4 is a block diagram illustrating an electrical structure of a disc drive according to an exemplary embodiment.

FIG. 4 is a block diagram illustrating an electrical structure of a disc drive 1000, which is an example of the storage device 1000 of FIG. 1, according to an exemplary embodiment. Referring to FIG. 4, the disc drive 1000 includes a preamplifier 410, a read/write (R/W) channel 420, a processor 430, a voice coil motor (VCM) driver 440, a spindle motor (SPM) driver 450, a ROM 460, a RAM 470, and a host interface 480.

The processor 430 may be a digital signal processor (DSP), a microprocessor, or a microcontroller. The processor 430 controls the R/W channel 420 to read information from, or write information to, a disc 12 according to a command received from the host device 2000 of FIG. 1 via the host interface 480.

The processor 430 is coupled to the VCM driver 440 that supplies driving current to drive a VCM 30. The processor 430 supplies a control signal to the VCM driver 440 so as to control movement of a head 16.

The processor 430 is also coupled to the SPM driver 450 that supplies driving current to drive a spindle motor (SPM) 14. When power is supplied to the processor 430, the processor 430 supplies the control signal to the SPM driver 450 so as to rotate the SPM 14 at a desired speed.

The processor 430 is also coupled to the ROM 460 and the RAM 470. The ROM 460 stores firmware and control data for controlling the disc drive 1000. Program code and information for performing the methods illustrated in FIGS. 13, 14, 15, 16, 17, 18 and 33 may be stored in the ROM 460 or may be stored in the maintenance cylinder area of the disc 12 instead of in the ROM 460.

In the RAM 470, the program codes stored in the ROM 460 or the disc 12 are loaded in an initial mode, under control of the processor 430, and data received via the host interface 480, or read from the disc 12, is temporarily stored.

The RAM 470 may be embodied as dynamic random access memory (DRAM) or synchronous random access memory (SRAM). Also, the RAM 470 may be designed to be driven according to a Single Data Rate (SDR) or Double Data Rate (DDR) manner.

The processor 430 may control the disc drive 1000 to perform the methods illustrated in FIGS. 13, 14, 15, 16, 17, 18 and 33 by using the program codes and information stored in the ROM 460 or the maintenance cylinder area of the disc 12.

Next, the read process and the write process of the disc drive 1000 will be described.

In a read mode, the disc drive 1000 amplifies an electrical signal, which is sensed from the disc 12 by the head 16, by using the preamplifier 410. Next, in the R/W channel 420, data is detected by amplifying the signal output from the preamplifier 410 by using an AGC circuit (see FIG. 7) that automatically varies a gain according to an amplitude of a signal, converting the amplified signal into a digital signal, and then decoding the digital signal. The processor 430 error-corrects the detected data by using, for example, a Reed Solomon code, which is an error correcting code, transforms the data into stream data, and then transmits the stream data to the host device 2000 via the host interface 480.

In a write mode, the disc drive 1000 receives data from the host device 2000 via the host interface 480, adds an error correcting code (ECC) symbol to the data according to the Reed Solomon code by using the controller 430, codes the data by the R/W channel 420 so that the data is suitable for a writing channel, and then writes the data to the disc 12 via the head 16 by using write current amplified by the preamplifier 410.

A method of performing the read/write process on a recording medium by the processor 430, based on the program codes and information loaded to the RAM 470, which are related to the methods of FIGS. 13, 14, 15, 16, 17, 18 and 33, according to an exemplary embodiment, will now be described in detail.

First, a defect inspection process is performed to determine a massive defective area of a disc drive. The defect inspection process may be performed during the manufacture of the disc drive. The defect inspection process may also be performed in a user environment, as will be described later in detail with reference to FIGS. 32 and 33.

Figure 7:
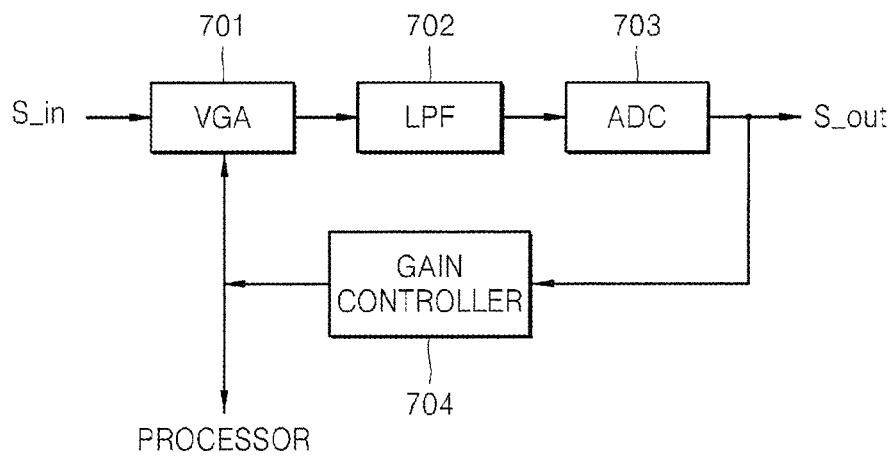
FIG. 7 is a block diagram of an automatic gain control (AGC) circuit that calculates a servo gain, according to an exemplary embodiment.

When the defect inspection process is performed using a servo gain according to an exemplary embodiment, an AGC circuit that calculates the servo gain as illustrated in FIG. 7 may also be used.

Referring to FIG. 7, the AGC circuit includes a variable-gain amplifier (VGA) 701, a low-pass filter (LPF) 702, an analog-to-digital converter (ADC) 703, and a gain controller 704. The AGC circuit may be included in the read/write channel 420 of FIG. 4.

The VGA 701 amplifies a reproduction signal S_in, which was received from the preamplifier 410 of FIG. 4, by a gain Gi generated by the gain controller 704, and then outputs the amplified signal to the LPF 702.

The LPF 702 allows a low-frequency signal to pass therethrough and blocks a high-frequency noise from among the amplified signal received from the VGA 701.

The ADC 703 transforms the analog signal output from the LPF 702 into a digital signal S_out and then outputs the digital signal. The digital signal S_out is decoded by a decoder (not shown) of the read/write channel 420.

The gain controller 704 receives the digital signal S_out from the ADC 703 and controls the gain Gi of the VGA 701 according to the magnitude of the digital signal S_out. The gain Gi is increased when the magnitude of the digital signal S_out is less than a target level and is reduced when the magnitude of the digital signal S_out is greater than the target level. Thus, the gain Gi is disproportional to the magnitude of a signal input to the VGA 701.

In particular, when the magnitude of a signal input to the VGA 701 is very small, the magnitude of a digital signal output from the ADC 703 may not reach the target level even when the gain Gi of the VGA 701 is maximized.

As described above, the gain Gi generated in the AGC circuit is input to the processor 430.

Figure 8:
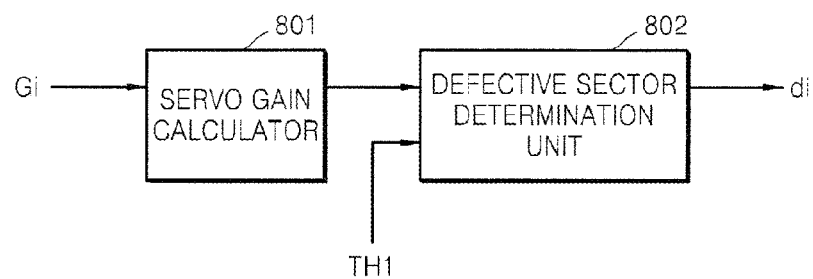
FIG. 8 is a block diagram of a defective sector detector according to an exemplary embodiment.

Then, the processor 430 may determine whether a defective sector is present by using a defective sector detector illustrated in FIG. 8, according to an exemplary embodiment.

Referring to FIG. 8, the defective sector detector according to an exemplary embodiment includes a servo gain calculator 801 and a defective sector determination unit 802.

The servo gain calculator 801 calculates a servo gain of each servo sector by using servo gains generated in an AGC circuit in a section in which a servo signal recorded on a track is reproduced. For example, the servo gain of each servo sector may be calculated by calculating an average of servo gains generated in the AGC circuit in a section in which servo signals are reproduced in units of servo sectors.

The defective sector determination unit 802 receives the servo gain of each servo sector from the servo gain calculator 801, determines data sectors included in a servo sector, the servo gain of which exceeds a first threshold TH1 to be defective sectors, and outputs information di indicating the defective sectors. The first threshold TH1 is a boundary value for satisfactorily performing the read/write process data and may be experimentally set.

Figure 9:
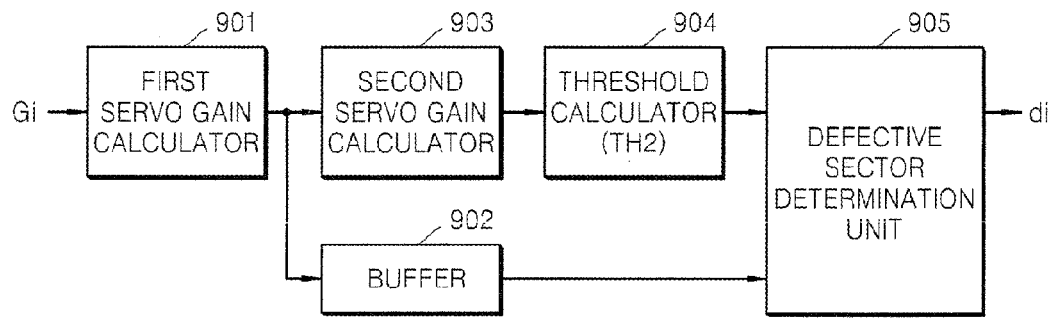
FIG. 9 is a block diagram of a defective sector detector according to another exemplary embodiment.

Otherwise, the processor 430 may determine whether a defective sector is present by using a defective sector detector illustrated in FIG. 9, according to another exemplary embodiment.

Referring to FIG. 9, the defective sector detector according to another exemplary embodiment includes a first servo gain calculator 901, a buffer 902, a second servo gain calculator 903, a threshold value calculator 904, and a defective sector determination unit 905.

The first servo gain calculator 901 calculates a servo gain of each servo sector by using other servo gains generated in an AGC control circuit in a section in which a servo signal recorded on a track is reproduced. For example, the servo gain of each servo sector may be calculated by calculating an average of servo gains generated in the AGC circuit in a section in which servo signals are reproduced in units of servo sectors.

The buffer 902 stores servo gains calculated in units of servo sectors of each track. The buffer 902 may be embodied as the RAM 470 included in the disc drive 1000 of FIG. 4.

The second servo gain calculator 903 calculates a servo gain of each track by calculating an average of servo gains in units of servo sectors of each track.

The threshold value calculator 904 calculates a second threshold TH2 by multiplying the servo gain of each track, which is calculated by the second servo gain calculator 903, by a proportional constant α. The proportional constant α may be greater than '0' and less than '1', and may be experimentally determined in such a manner that the second threshold TH2 may be determined to be a servo gain boundary value for satisfactorily performing a read/write process.

The defective sector determination unit 905 determines data sectors included in a servo sector, the servo gain of which is read by the buffer 902 and is greater than the second threshold TH2, to be defective sectors, and then outputs information di indicating the defective sectors.

Next, a defective sector detector that performs a defect inspection process using error correction, according to another exemplary embodiment, will now be described with reference to FIG. 10.

Figure 10:
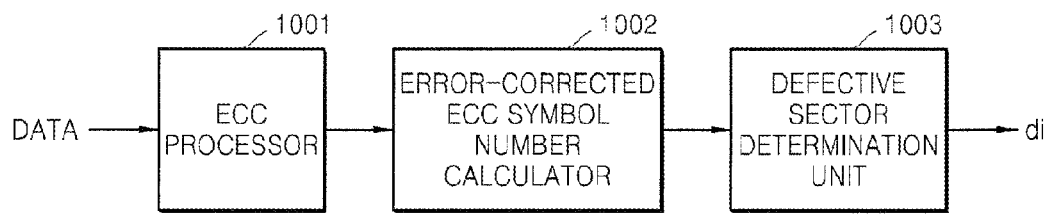
FIG. 10 is a block diagram of a defective sector detector according to another exemplary embodiment.

Referring to FIG. 10, the defective sector detector includes an error correcting code (ECC) processor 1001, a error-corrected ECC symbol number calculator 1002, and a defective sector determination unit 1003.

The ECC processor 1001 performs error correction by using an error correcting code (ECC) included in information read by a Reed Solomon decoder (not shown) from a data sector of a recording medium having recorded thereon test data. The ECC processor 1001 detects an ECC symbol, the error of which is corrected, from among ECC symbols included in the information read from the data sector, and outputs information indicating the detected error-corrected ECC symbol.

The error-corrected ECC symbol number calculator 1002 calculates the total number of error-corrected ECC symbols in units of data sectors, based on the information indicating the detected error-corrected ECC symbol, which is received from the ECC processor 1001.

The defective sector determination unit 1003 counts the total number of error-corrected ECC symbols in units of data sectors, determines a data sector, the total number of error-corrected ECC symbols of which is greater than a third threshold, to be a defective sector, and then outputs information di indicating the defective sector. The third threshold is set to be less than or equal to a maximum number of ECC symbols that may be normally error-corrected in each sector. For example, the third threshold may be 90% of the maximum number of ECC symbols that may be normally error-corrected in each sector.

Next, the processor 430 of the disc drive 1000 illustrated in FIG. 4 analyzes the distribution of defective sectors detected by a defective sector detector described above, and determines a massive defective area.

In general, a massive defect may occur in a disc drive, caused by disc warping or uneven generation of magnetic layers during the assembly of the disc drive. Of course, various other mishaps may cause a massive defect to occur in a disc drive.

The processor 430 determines an area in which a defect, the value of which is greater than an initially set threshold, occurs in units of tracks, to be a massive defective area. Here, the threshold may be set to a track length corresponding to a time needed for performing track switching on a disc. In detail, the threshold may be set to the total number of servo or data sectors corresponding to the time needed for performing track switching on the disc.

Otherwise the processor 430 may determine an area in which a defect, the value of which is greater than an initially set threshold, occurs in at least one adjacent track, to be a massive defective area.

Otherwise, the processor 430 may determine an area in which a defect, the value of which is greater than a threshold and that occurs in consecutive data sectors of one track, occurs continuously in at least one adjacent track and a percentage of the consecutive data sectors having the defect and facing each other on adjacent tracks is equal to or greater than an initially set percentage, to be a massive defective area.

Figure 19:
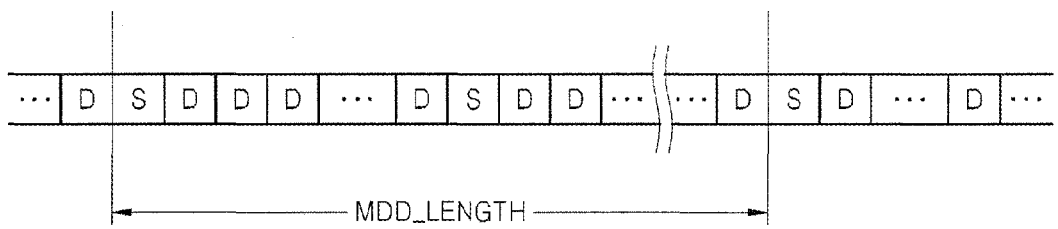
FIG. 19 is a diagram illustrating a method of determining a massive defective area on the basis of a servo sector in a track-wise direction, according to an exemplary embodiment.
Figure 20:
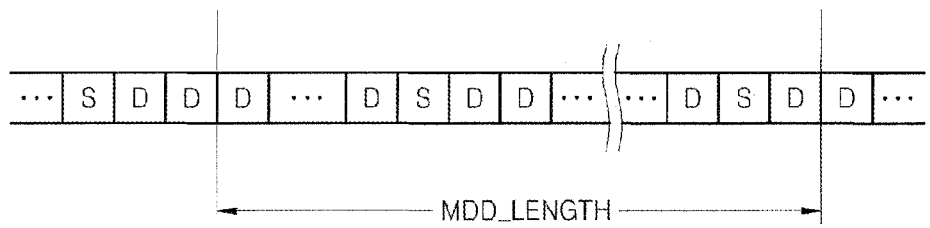
FIG. 20 is a diagram illustrating a method of determining a massive defective area on the basis of a data sector in a track-wise direction, according to another exemplary embodiment.

The processor 430 may determine a length MDD_LENGTH of a massive defective area in a track-wise direction, in units of servo sectors as illustrated in FIG. 19 or in units of data sectors as illustrated in FIG. 20.

Figure 21:
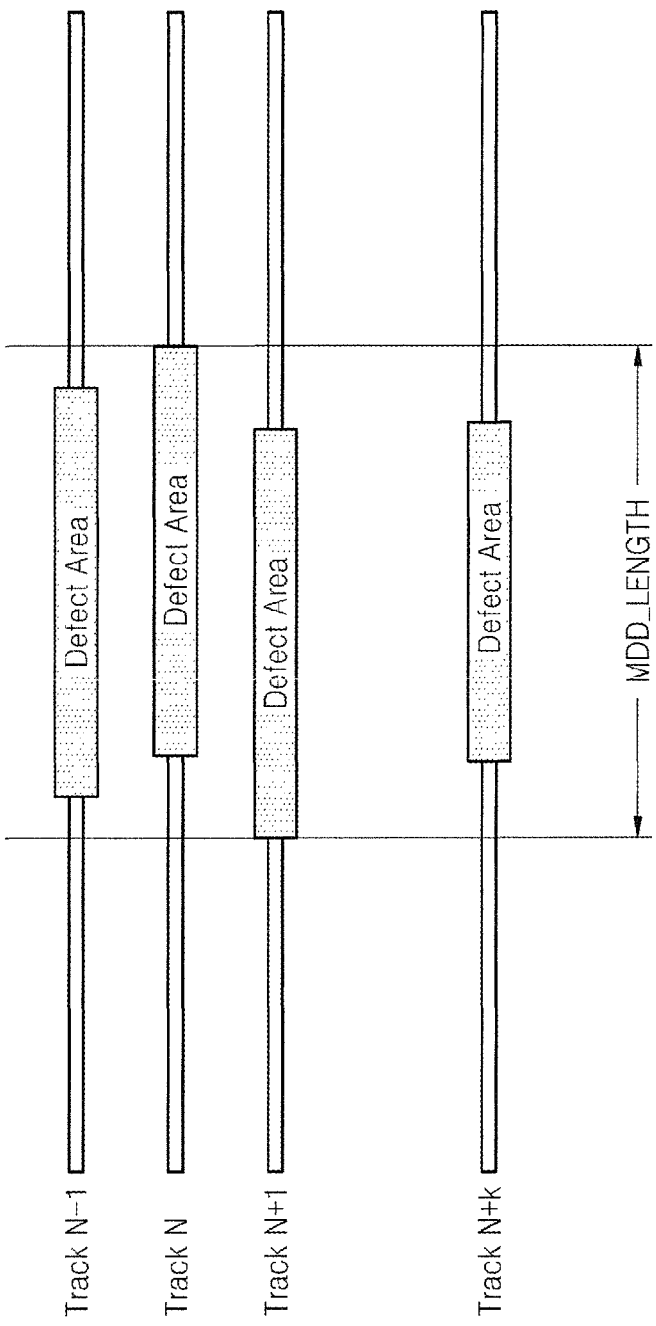
FIG. 21 is a diagram illustrating a method of determining the length of a massive defective area in a track-wise direction, according to an exemplary embodiment.

Otherwise, the processor 430 may determine the length MDD_LENGTH of a massive defective area of each track, which is included in the massive defective area, in the track-wise direction to be the same for all disc data zones. In detail, the processor 430 may determine the length MDD_LENGTH so as to cover all consecutive defective data sectors in each track included in the massive defective area, as illustrated in FIG. 21.

Figure 22:
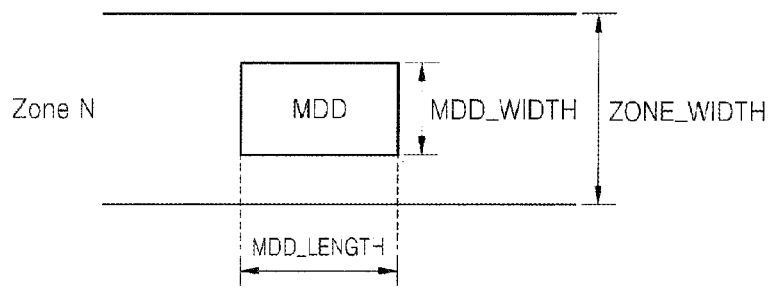
FIG. 22 is a diagram illustrating a method of determining the width of a massive defective area in a disc radius-wise direction, according to an exemplary embodiment.

Next, a method of determining a width MDD_WIDTH of a massive defective area in a disc radius-wise direction, performed by the processor 430, according to an exemplary embodiment, will be described with reference to FIG. 22.

The processor 430 may determine the width MDD_WIDTH so as to cover only a track having defects occurring consecutively therein. Also, the processor 430 may determine the width MDD_WIDTH in such a manner that the width MDD_WIDTH may be expanded to be equal to a width ZONE_WIDTH of a zone including the massive defective area.

According to another exemplary embodiment, the processor 430 may determine the MDD_WIDTH to be expanded so as be equal to the ZONE_WIDTH when the ratio of the width MDD_WIDTH to the width ZONE_WIDTH is greater than an initially set percentage, and may determine the MDD_WIDTH so as to cover only a track having defects occurring consecutively therein when the ratio of the width MDD_WIDTH to the width ZONE_WIDTH is less than or equal to the initially set percentage. Here, the initially set percentage may be 50% but exemplary embodiments are not limited thereto.

Methods of determining a massive defective area in units of zones by the processor 430 of FIG. 4 when massive defects have various shapes, according to exemplary embodiments, will now be described with reference to FIGS. 23 to 27.

Figure 23:
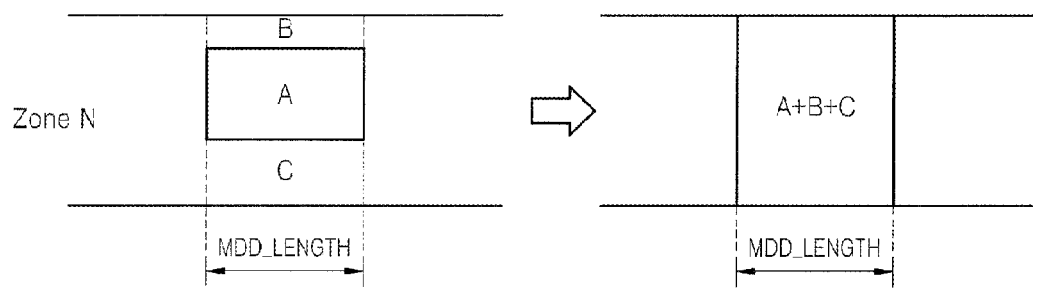
FIGS. 23, 24, 25, 26, and 27 are concept diagrams of data zones for explaining methods of determining a massive defective area in units of zones when massive defects have various shapes, according to exemplary embodiments.

Referring to FIG. 23, if a single massive defect occurs in one data zone N, then the processor 430 determines a width of a massive defective area to be expanded so as to be equal to the width of the data zone N including an actual massive defective area A and areas B and C each having no massive defect.

Figure 24:
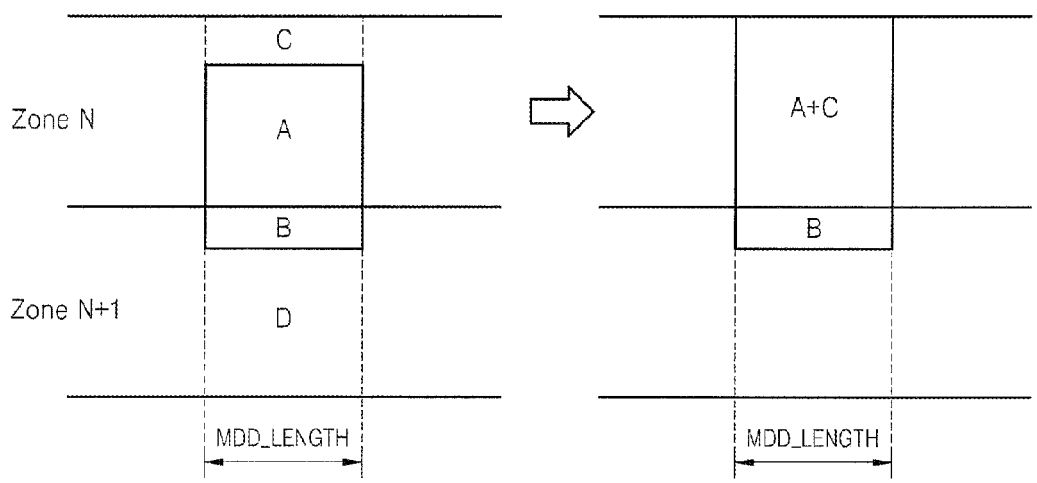

Referring to FIG. 24, when a massive defect occurs over a plurality of data zones N and N+1, then the processor 430 may determine a width of a massive defective area to be equal to the width of the data zone N having a massive defective area, in the data zone N in which the ratio of the width of a massive defective area in a disc radius-wise direction to the width of a data zone having a massive defective area is greater than an initially set percentage, and may determine a width of a massive defective area to cover only a track having consecutive defects, in a data zone N+1 in which the ratio of the width of a massive defective area in the disc radius-wise direction to the width of a data zone having a massive defective area is less than or equal to the initially set percentage. In other words, the massive defective area A is expanded to an area (A+C) in the data zone N but the massive defective area B is not expanded in the data zone N+1.

Figure 25:
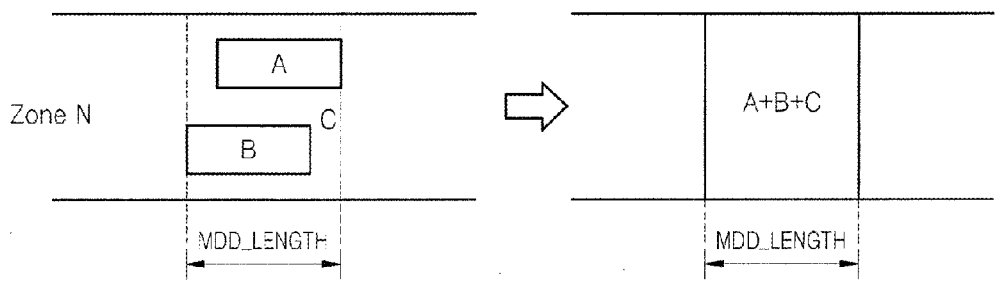

Referring to FIG. 25, if a plurality of massive defects occur in one data zone N, then the processor 430 may determine a length MDD_LENGTH of a massive defective area in a track-wise direction so as to cover all the plurality of massive defects occurring in the data zone N. That is, a massive defective area in the data zone N may be determined to range from one massive defective area A and another massive defective area B in the data zone N to an area C having no massive defect.

Figure 26:
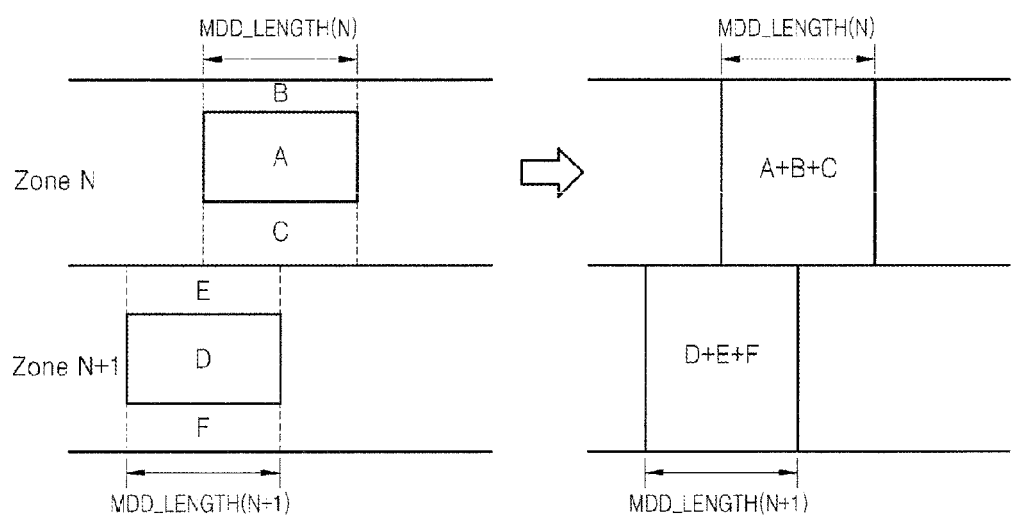

Referring to FIG. 26, if massive defects occur independently in adjacent data zones N and N+1, respectively, then the processor 430 independently determines a massive defective area in the data zones N and N+1. That is, when the ratio of the width of the massive defective area in the data zone N to that of the data zone N and the ratio of the width of the massive defective area in the data zone N+1 to that of the data zone N+1 are greater than an initially set percentage, then the widths of the massive defective areas in the data zone N and the data zone N+1 are expanded to be equal to those of the data zone N and the data zone N+, respectively. Thus, the massive defective area in the data zone N is determined to be an area (A+B+C), and the massive defective area in the data zone N+1 is determined to be an area (D+E+F).

Figure 27:
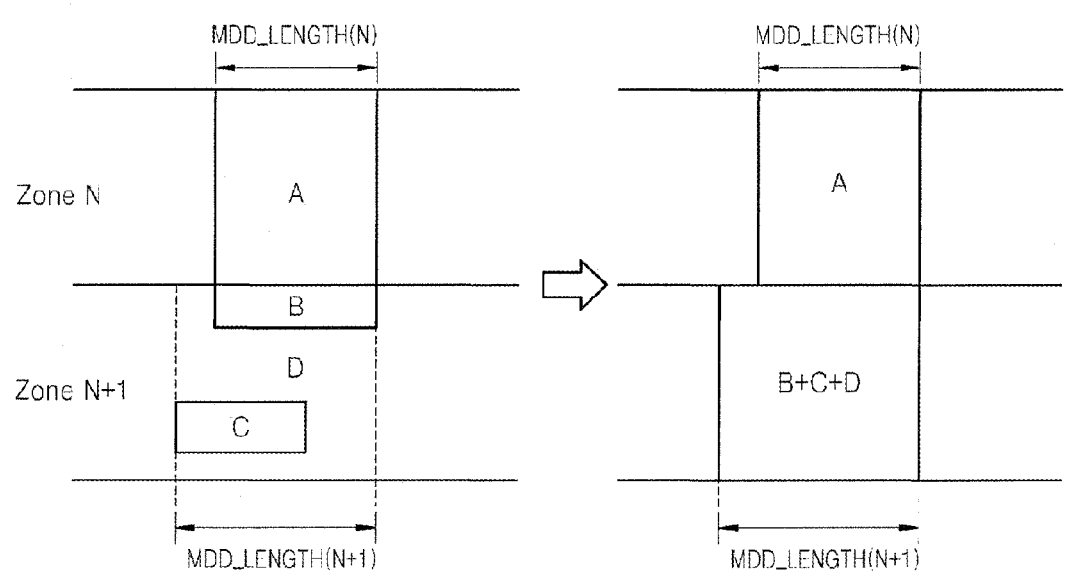

Referring to FIG. 27 if one massive defect occurs over a plurality of data zones N and N+1 and a plurality of massive defects occur in one data zone, i.e., the data zone N+1, then the processor 430 independently determines a massive defective area in the data zone N and the data zone N+1. That is, an area A in which the massive defect occurs is determined as a massive defective area in the data zone N, and an area (B+C+D) is determined as a massive defective area in the data zone N+1 so as to determine a single massive defective area in units of data zones.

Figure 29:
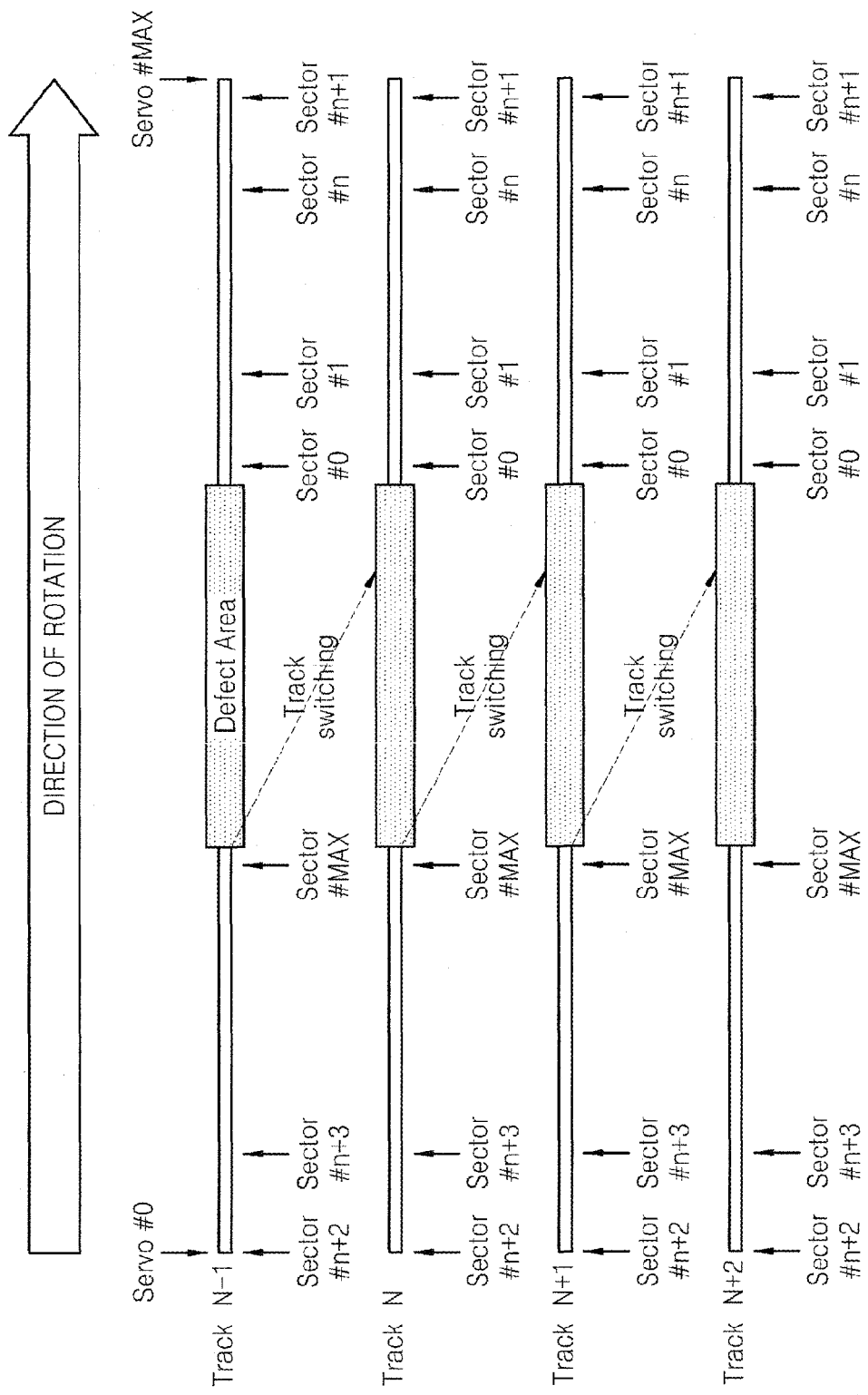
FIG. 29 illustrates a track construction for explaining track switching performed in a massive defective area, according to an exemplary embodiment.
Figure 30:
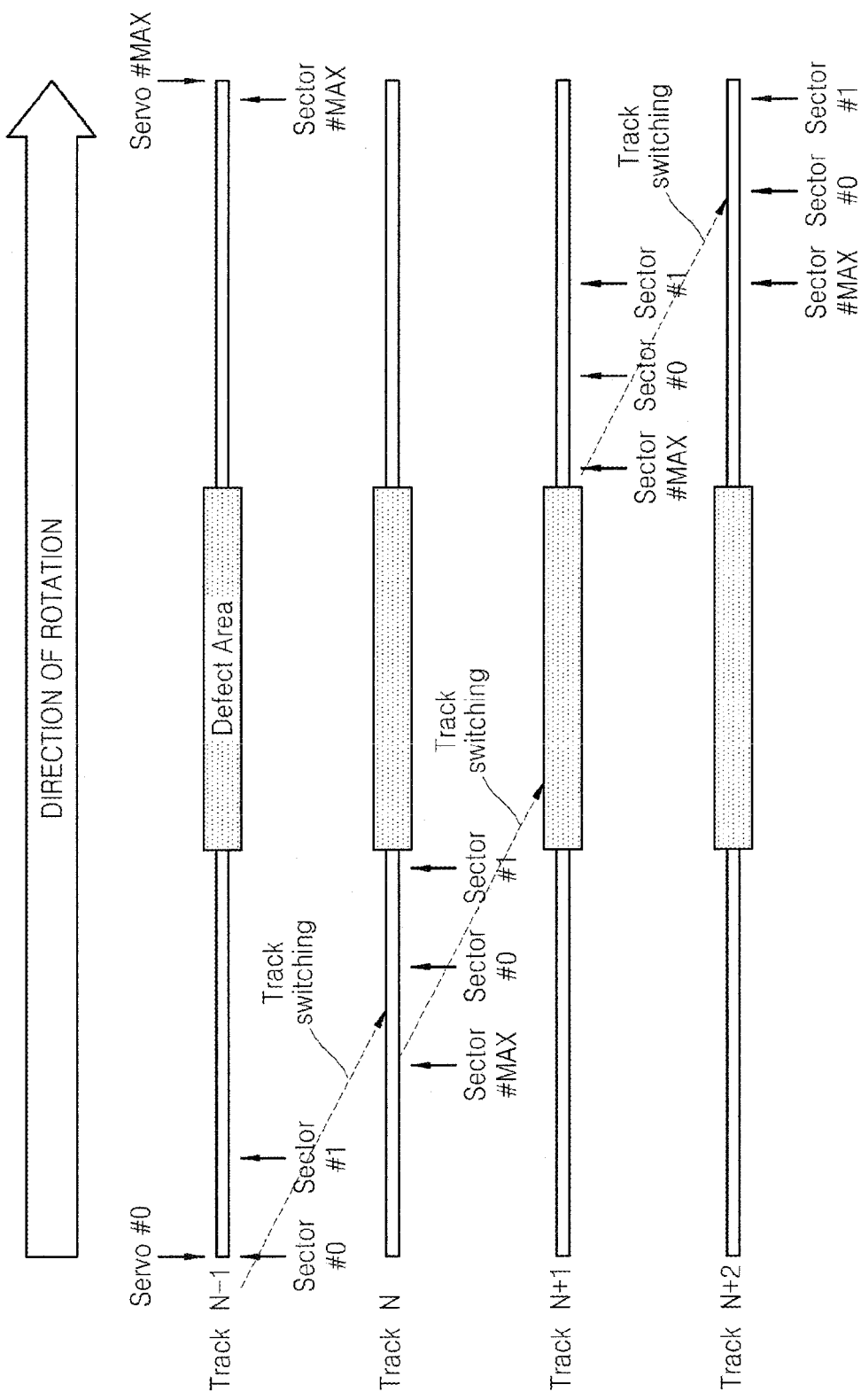
FIG. 30 illustrates a track construction for explaining track switching performed in a massive defective area when an exemplary embodiment is not applied.

Referring to FIG. 29, the processor 430 determines a first data sector following a massive defective area in a track included in the massive defective area to be a sector #0 which is a starting sector. That is, a second parameter indicating the location of the starting sector may be presented as location information of the first data sector by using skew information MDD_SKEW.

In other words, the skew information MDD_SKEW may be defined as the length of a section from a sector location where SIM information indicating the start of a sector in the track is detected to the location of the first data sector following the massive defective area. The skew information MDD_SKEW may be presented using the total number of servo sectors or data sectors.

Figure 28:
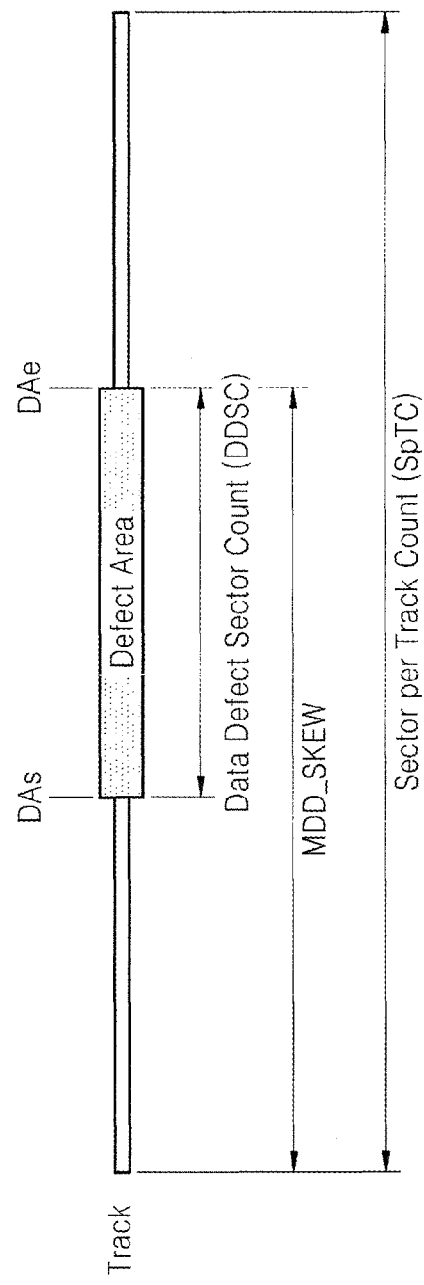
FIG. 28 illustrates a track construction for explaining a method of adjusting a logical track length in a massive defective area, according to an exemplary embodiment.

Referring to FIG. 28, when a massive defective area in a track-wise direction ranges from a sector location DAs to a sector location DAe, the processor 430 may calculate a first parameter SpTC' indicating a logical track length adjusted in the massive defective area, as follows:

$$SpTC'=SpTC-DDSC \qquad (1),$$

wherein 'SpTC' denotes a physical track length in the massive defective area, and 'DDSC' denotes the length of the massive defective area.

Specifically, 'SpTC' denotes the total number of data sectors included in one track, and 'DDSC' denotes the total number of data sectors included in a massive defective area in one track. 'DDSC' is a parameter having the same concept as the length MDD_LENGTH of the massive defective area in the track-wise direction as described above.

The first parameter SpTC that denotes the logical track length in the massive defective area, is adjusted to be equal to the result of subtracting the total number of data sectors included in a massive defective area of each track from the total number of data sectors of each track. That is, the logical track length is adjusted in such a manner that a logical address is not assigned to the data sectors in the massive defective area of each track. Accordingly, there is no need to produce a defect list with respect to the sectors included in the massive defective area of each track.

Referring to FIG. 4, the processor 403 controls the disc drive to store information related to a massive defective area in the disc 12 or the ROM 460. The information related to the massive defective area may include a second parameter indicating the location of a logical sector #0 in the massive defective area, and a first parameter indicating a logical track length adjusted in the massive defective area, i.e., the total number of logical sectors per track. The information related to the massive defective area may further include head information, starting cylinder information of the massive defective area, and last cylinder information of the massive defective area.

If the width MDD_WIDTH of the massive defective area is determined in such a manner that the width MDD_WIDTH of the massive defective area may be equal to the width ZONE_WIDTH of a zone including the massive defective area, then information regarding the track location of the massive defect may include head information and zone information.

The processor 430 loads the information related to the massive defective area stored in the disc 12 or the ROM 460 to the RAM 470, and performs the read/write process, based on the loaded information.

FIG. 11 is a block diagram of a starting sector detection circuit that detects the location of a starting sector in a track during the read/write process, according to an exemplary embodiment. The starting sector detection circuit of FIG. 11 may be designed to be included in the processor 430 of the disc drive 1000 of FIG. 4. Otherwise, the starting sector detection circuit of FIG. 11 may be designed to not be included in the processor 430. That is, the starting sector detection circuit may be designed to be included in the read/write channel 420 of FIG. 4.

Referring to FIG. 11, the starting sector detection circuit includes an SIM information detector 1101, a first sector counter 1102, a first comparator 1103, and a starting sector detector 1104.

The SIM information detector 1101 produces a first signal operation S1 when SIM information is detected from a servo signal that is being reproduced. The SIM information is a signal indicating the start of a first servo sector in a track.

When the first sector counter 1102 receives the first signal operation S1 from the SIM information detector 1101, the first sector counter 1102 is reset, counts the total number of input data sector pulses, and then outputs sector information containing a result of the counting.

The first comparator 1103 compares skew information P1 corresponding to the location of the SIM and a second parameter with the sector information received from the first sector counter 1102, and outputs a signal containing a result of the comparison. If a track on which the read/write process is to be performed is included in a massive defective area, the skew information P1 has a value MDD_SKEW.

The starting sector detector 1104 produces a second signal S2 indicating a starting sector when the skew information P1 having the value MDD_SKEW is the same as the sector information, based on the signal received from the first comparator 1103.

Accordingly, with the starting sector detection circuit, it is possible to detect a starting sector, i.e., a logical sector #0, in a target track. The processor 430 may perform the read/write process on the target track, based on the detected logical sector.

Next, the processor 430 performs track switching control by using a track switching circuit illustrated in FIG. 12, according to an exemplary embodiment.

Referring to FIG. 12, the track switching control circuit includes a second sector counter 1201, a second comparator 1202, and a track switching control signal generator 1203.

The starting sector detection circuit described above with reference to FIG. 11 may be designed to be included in the processor 430 of the disc drive 1000 illustrated in FIG. 4.

When the second signal S2 is input to the second sector counter 1201 from the starting sector detector 1104 of FIG. 11, then the second sector counter 1201 is reset, counts the total number of input data sector pulses, and outputs sector information containing a result of the counting.

The second comparator 1202 compares the number P2 of logical sectors per track with the result of the counting received from the second sector counter 1201, and outputs a signal containing a result of the comparison. If a track on which the read/write process is to be performed is included in a massive defective area, the number P2 of logical sectors per track becomes equal to a first parameter SpTC' obtained by adjusting a logical track length.

If the number P2 of logical sectors per track is the same as the sector information received from the second sector counter 1201, the track switching control signal generator 1203 produces a track switching control signal at the end of a target sector. The track switching control signal is used to move the head 16 from an $N^{th}$ track to an $(N+1)^{th}$ track when a current track of the disc 12 followed by the head 16 is the $N^{th}$ track.

Referring to FIG. 4, the track switch control signal produced as described above is applied to the VCM driver 440, and the VCM driver 440 generates driving current corresponding to the track switch control signal and supplies the driving current to the voice coil motor 30. Then, the voice coil motor 30 is driven to move the head 16 from the $N^{th}$ track to the $(N+1)^{th}$ track.

Thus, as illustrated in FIG. 29, in a massive defective area, track switching starts at a sector #MAX corresponding to the first parameter SpTC and ends in the massive defective area. If the length of a massive defective area in each track, which is included in the massive defective area, in the track-wise direction is determined to be the same in units of disc zones, the location of the #MAX in each track included in the massive defective area is the same as illustrated in FIG. 29.

Next, a method of performing defect management on a recording medium under control of the processor 430 according to an exemplary embodiment, will be described with reference to FIGS. 13, 14, 15, 16 and 17.

First, a method of performing the read/write process on a recording medium according to an exemplary embodiment, will be described with reference to FIG. 13. The processor 430 controls the disc drive 1000 to perform a process of determining a massive defective area in the disc 12 which is a recording medium (operation S101). A process of determining a massive defective area in a recording medium, according to an exemplary embodiment, will be described with reference to FIG. 14.

Figure 14:
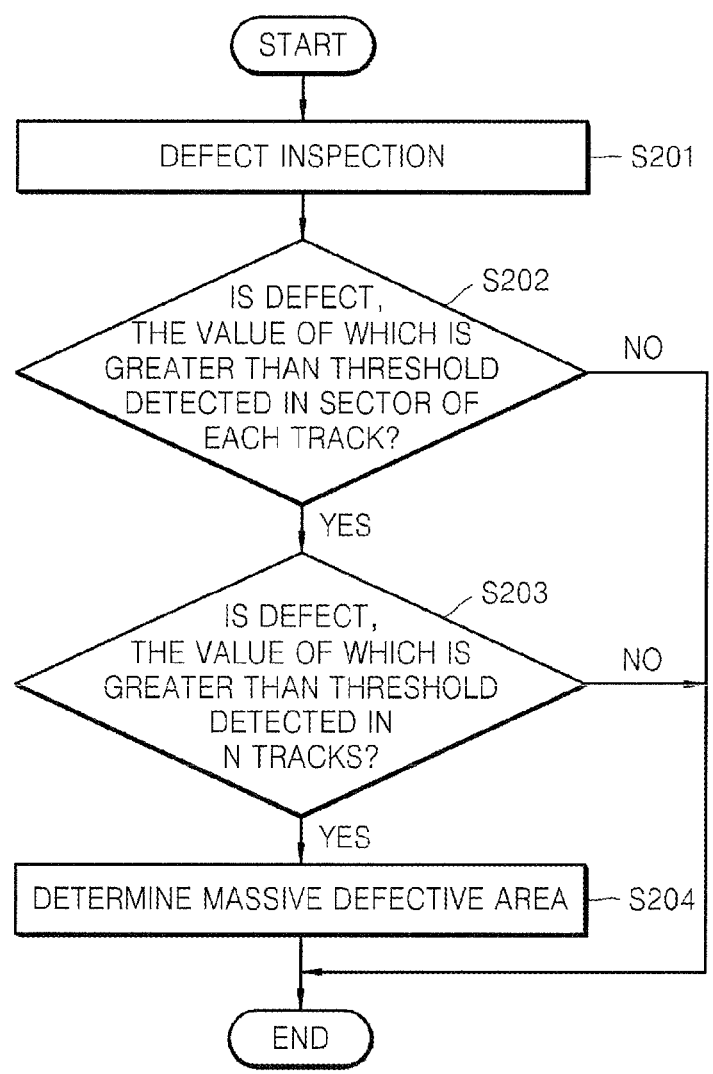
FIG. 14 is a flowchart illustrating a method of determining a massive defective area, according to an exemplary embodiment.

Referring to FIG. 14, the processor 430 controls the disc drive 1000 to perform a defect inspection process on the disc 12 so as to determine a massive defective area (operation S201).

Figure 15:
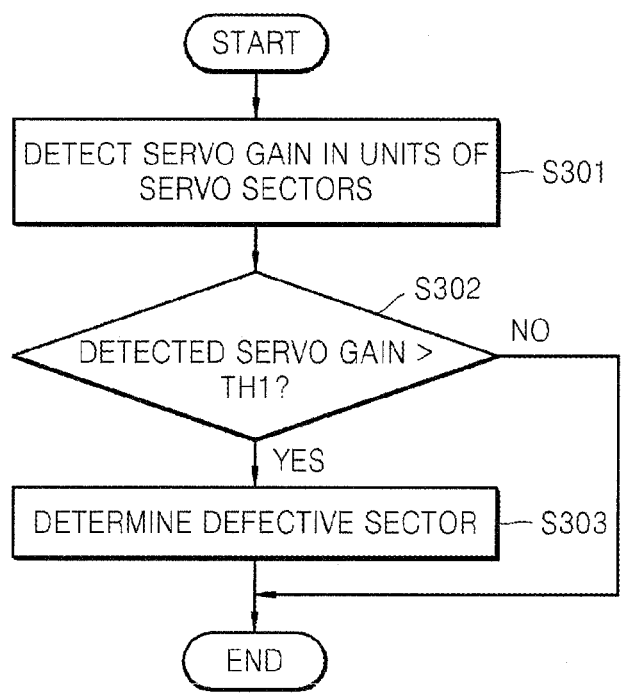
FIG. 15 is a flowchart illustrating a method of detecting a defective sector, according to an exemplary embodiment.

A defect inspection process according to an exemplary embodiment will now be described with reference to FIG. 15. Referring to FIG. 15, the processor 430 controls the disc drive 1000 to detect a servo gain in units of servo sectors (operation S301). In detail, the processor 430 controls the disc drive 1000 to detect a servo gain in units of servo sectors by receiving servo gains generated by an AGC circuit in a section in which a servo signal recorded on a track is reproduced. For example, a servo gain may be detected in units of servo sectors by calculating an average of servo gains generated by the AGC circuit in a section in which servo signals are reproduced in units of servo sectors.

Next, the processor 430 compares the servo gains in units of servo sectors detected in operation S301 with a first threshold TH1 (operation S302). The first threshold TH1 is a boundary value for successfully performing the read/write process and may be experimentally set.

If it is determined in operation S302 that some of the servo gains are greater than the first threshold TH1, then the processor 430 determines data sectors included in corresponding servo sectors to be defective sectors (operation S303).

Figure 16:
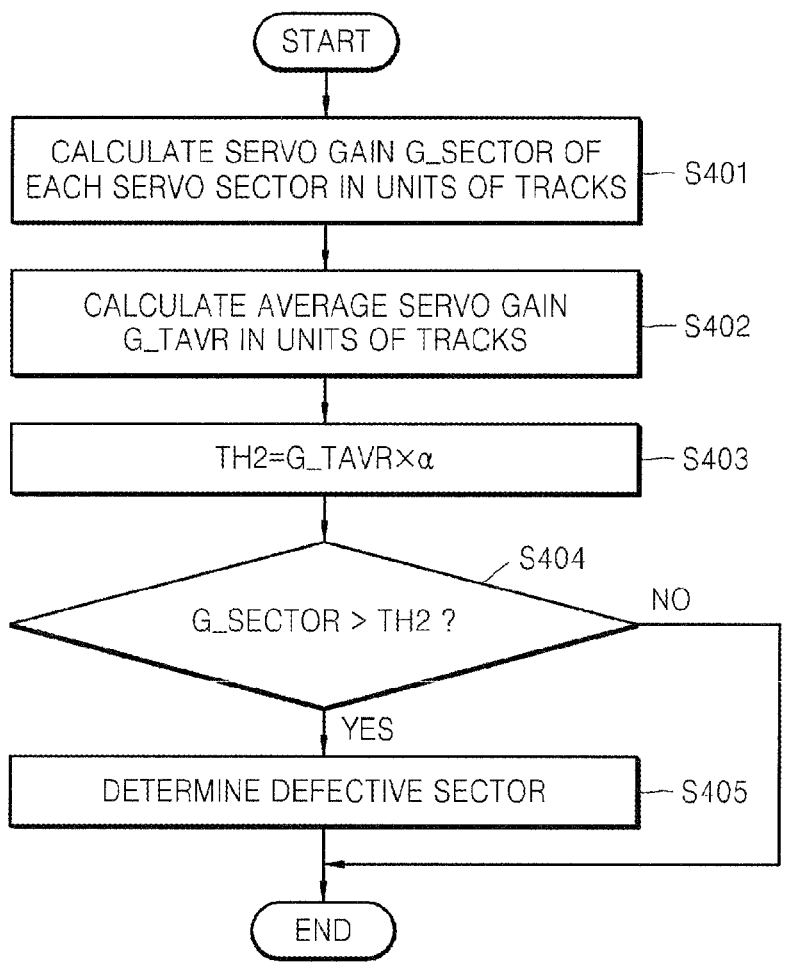
FIG. 16 is a flowchart illustrating a method of detecting a defective sector, according to another exemplary embodiment.

A defect inspection process according to another exemplary embodiment will now be described with reference to FIG. 16. Referring to FIG. 16, the processor 430 controls the disc drive 1000 to detect a servo gain G_SECTOR of each servo sector in units of tracks (operation S401). The servo gain G_SECTOR of each servo sector is obtained by receiving servo gains generated by the AGC circuit in a section in which a servo signal recorded on a track is reproduced. For example, the servo gain G_SECTOR of each servo sector may be calculated by calculating an average of servo gains generated by the AGC circuit in a section in which servo signals are reproduced.

Next, the processor 430 calculates an average G_TAVR of the servo gains G_SECTOR obtained in units of tracks, in operation S401 (operation S402).

Next, the processor 430 calculates a second threshold TH2 by multiplying the average G_TAVR calculated in operation S402 by a proportional constant α (operation S403). The proportional constant α is greater than '0' and is less than '1', and may be experimentally set in such a manner that the second threshold TH2 may be determined to be a boundary value of a servo gain for successfully performing the read/write process.

Next, the processor 430 compares the servo gains G_SECTOR in units of servo sectors with the second threshold TH2 (operation S404).

Next, if it is determined in operation S404 that some of the servo gains G_SECTOR in units of servo sectors are greater than the second threshold TH2, then the processor 430 determines data sectors included in corresponding servo sectors to be defective sectors (operation S405).

Figure 17:
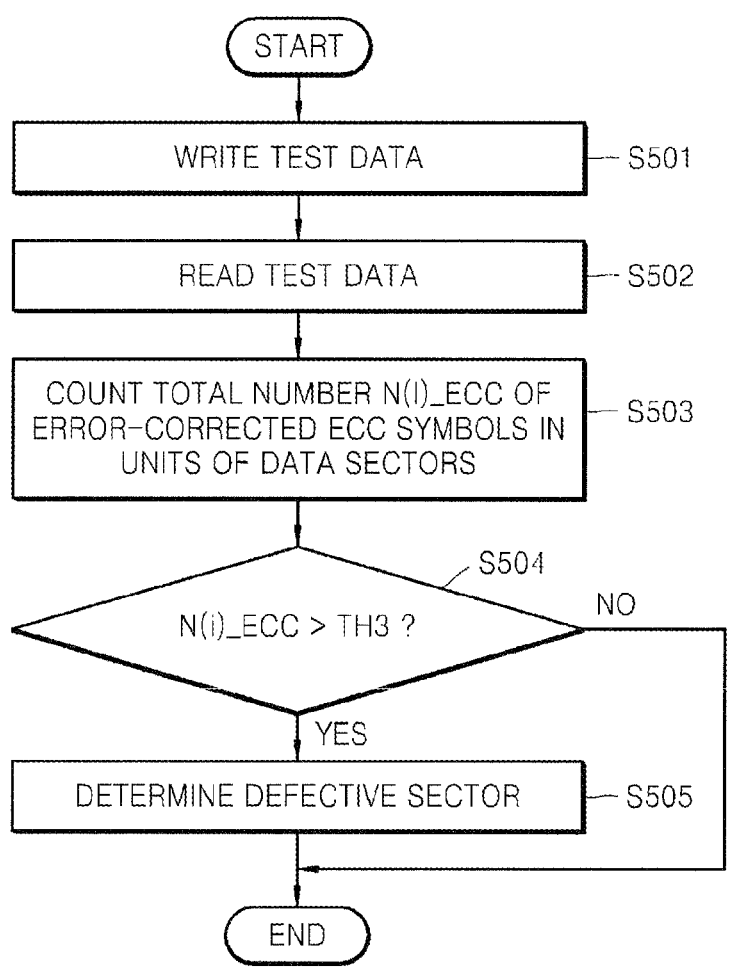
FIG. 17 is a flowchart illustrating a method of detecting a defective sector, according to another exemplary embodiment.

A defect inspection process according to another exemplary embodiment will now be described with reference to FIG. 17. Referring to FIG. 17 the processor 430 controls the disc drive 1000 to write test data to a data region of the disc 12 (operation S501).

Next, the processor 430 controls the disc drive 1000 to read the test data from the data region (operation S502).

Then, the processor 430 detects error-corrected ECC symbols from among ECC symbols included in information read from a data sector containing the test data of the disc 12, and counts the total number N(i)_ECC of error-corrected ECC symbols in units of data sectors (operation S503).

Next, the processor 430 compares the total number N(i)_ECC of error-corrected ECC symbols with a third threshold TH3 (operation S504). The third threshold TH3 is set to be less than or equal to a maximum number of ECC symbols that may be normally error-corrected in one sector. For example, the third threshold TH3 may be 90% of the maximum number of ECC symbols.

Then, if it is determined in operation S504 that the total number N(i)_ECC of error-corrected ECC symbols is greater than the third threshold TH3, then the processor 430 determines the data sector to be a defective sector (operation S505).

A defect inspection process may be performed according to any one of the methods described above with reference to FIG. 15, 16 or 17.

Referring back to FIG. 14, after performing one of the defect inspection processes of FIG. 15, 16 or 17 in operation S201, the processor 430 determines whether a defect, the value of which is greater than a threshold, is detected in units of tracks by analyzing a distribution of defective sectors according to the result of performing this process (operation S202). Here, the threshold may be set to a track length corresponding to a time needed for performing track switching on the disc 12. Specifically, the threshold may be set to the total number of servo or data sectors corresponding the time needed for performing track switching on the disc 12.

If it is determined in operation S202 that a defect, the value of which is greater than the threshold, is detected, then the processor 430 determines whether such a defect is detected in N adjacent tracks (operation S203). Here, 'N' may be an integer that is equal to or greater than '1'.

If it is determined in operation S203 that a defect, the value of which is greater than the threshold, is detected in N consecutive adjacent tracks, then the processor 430 determines regions including corresponding defective sectors to be a massive defective area (operation S204). If it is determined in operation S203 that a defect, the value of which is greater than the threshold and that occurs in one track, occurs in at least one adjacent track and a percentage of data sectors having such a defect and facing each other on adjacent tracks is equal to or greater than an initially set percentage, then the processor 430 may determine a region including corresponding defective sectors to be a massive defective area.

According to another exemplary embodiment, operation S203 may be skipped in the process of determining a massive defective area, described above with reference to FIG. 14. In other words, a region in which a defect, the value of which is greater than an initially set threshold, occurs in units of tracks may be determined as a massive defective area regardless of whether such a defect occurs in adjacent tracks.

The processor 430 may determine the length MDD_LENGTH of and the width MDD_WIDTH of a massive defective area as described above with reference to FIGS. 19, 20, 21, 22, 23, 24, 25, 26 and 27.

Referring back to FIG. 13, after the processor 430 determines the massive defective area as described above, the processor 430 adjusts a logical track length of the massive defective area (operation S102). In detail, a first parameter representing the logical track length of the massive defective area is adjusted based on Equation (1).

Next, the processor 430 controls the disc drive 1000 to perform the read/write process in a zone including the massive defective area by using the adjusted first parameter (operation S103). That is, the logical track length may be adjusted in such a manner that a logical address is not assigned to data sectors included in the massive defective area, thereby reducing the capacity of memory for storing a defect list. In other words, the total number of data sectors on which defect management is to be performed may be reduced by not including data sectors included in the massive defective area in the defect list, thereby reducing the size of the defect list and a time needed for defect management.

Accordingly, it is possible to load a defect list of the entire disc to the RAM 470, the memory capacity of which is relatively small, and perform defect management, thereby reducing a time needed for defect management.

A method of performing a read/write process on a recording medium according to another exemplary embodiment will be described with reference to the flowchart of FIG. 18.

Figure 13:
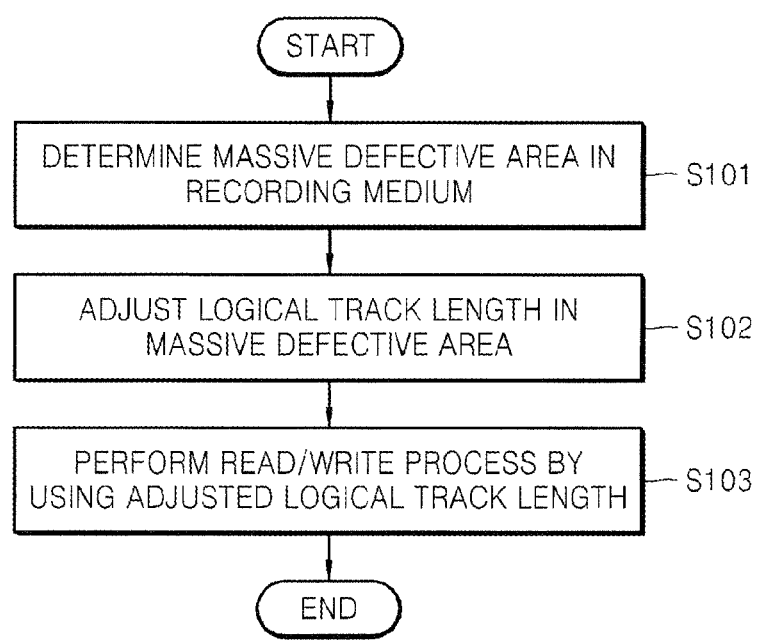
FIG. 13 is a flowchart illustrating a method of performing a read/write process on a recording medium, according to an exemplary embodiment.
Figure 18:
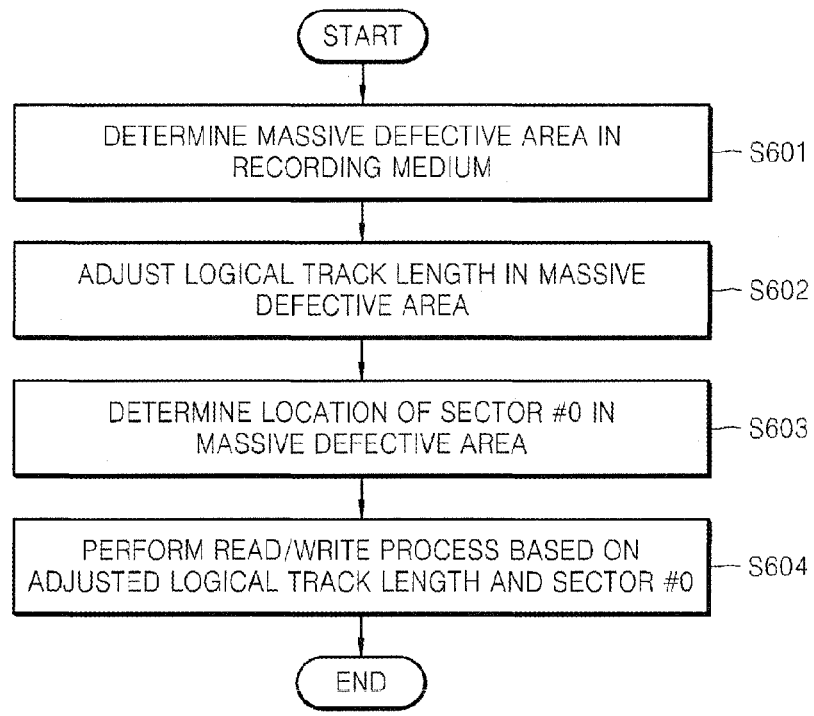
FIG. 18 is a flowchart illustrating a method of performing a read/write process on a recording medium, according to another exemplary embodiment.

In FIG. 18, operations S601 and S602 are the same as operations S101 and S102 of FIG. 13, respectively, and will thus not be described again here.

After a massive defective area is determined in a recording medium in operation S601 and a logical track length is adjusted in the massive defective area in operation S602, the processor 430 performs a process of determining the location of a sector #0 massive defective area (operation S603). In detail, as described above with reference to FIG. 29, the processor 430 determines a second parameter representing the location of a sector #0 (a starting sector) of each track included in the massive defective area to be a value representing the location of a first data sector located right at the end of the massive defective area.

Next, the processor 430 controls the disc drive 1000 to perform the read/write process based on a first parameter representing a logical track length adjusted in the massive defective area and the second parameter representing the location of the sector #0 (operation S604). That is, the processor 430 starts the read/write process starting from data sectors of the sector #0 of each track included in the massive defective area, and performs track switching when performing of the read/write process on data sectors of the sector #MAX ends, as illustrated in FIG. 29.

Accordingly, it is possible to complete performing of the read/write process on both a track and an adjacent track while the disc 12 is rotated one time by performing track switching in a defective region of the massive defective area.

Also, the same information MDD_SKEW indicating the location of a sector #0 is applied to each track included in the massive defective area, and a track skew in the massive defective area thus does not need to be calculated, thereby reducing an overhead in the read/write process.

Also, the information MDD_SKEW indicating the location of the sector #0 and information indicating the total number of logical sectors adjusted per track, are needed to perform the read/write process in each track included in the massive defective area, and additional table information, for example, is not needed, thereby allowing the read/write process to be performed in the massive defective area in a simple manner.

Figure 31:
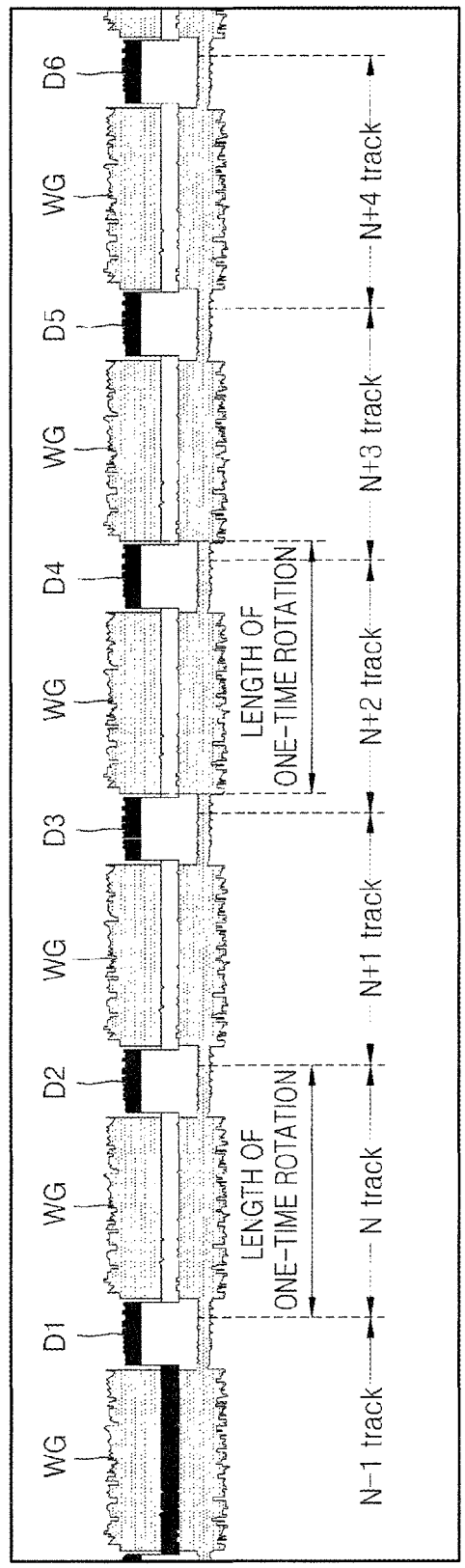
FIG. 31 is a waveform diagram of a write gate pulse signal when a write process is performed on a track including a massive defective area, according to an exemplary embodiment.

FIG. 31 is a waveform diagram of a write gate pulse signal WG when a write process is performed on a track including a massive defective area by performing defect management on a recording medium, according to an exemplary embodiment. Referring to FIG. 31, sections D1, D2, D3, D4, D5 and D6 in which the write gate pulse signal WG is not generated denote regions in which consecutive defective regions occur in tracks included in the massive defective area. FIG. 31 illustrates that since track switching is performed in the massive defective area, both performing of the write process on one track and switching from the track to an adjacent track may be completed while a disc is rotated one time.

If defect management according to an exemplary embodiment is not used, the location of a sector #0 is changed in units of tracks included in the massive defective area, according to a time needed for track switching, as illustrated in FIG. 3. In this case, a logical track length is equal to a physical track length. Thus, the sum of a time for rotating the disc one time and the time needed for track switching is needed so as to complete performing of the read/write process on one track in the massive defective area and switching from the track to an adjacent track.

Next, a method of performing defect management on a recording medium in a disc drive via a network, according to an exemplary embodiment, will be described.

First, a network system that adjusts parameters related to performing of the read/write process in the disc drive via a network according to an exemplary embodiment, will be described with reference to FIG. 32.

Figure 32:
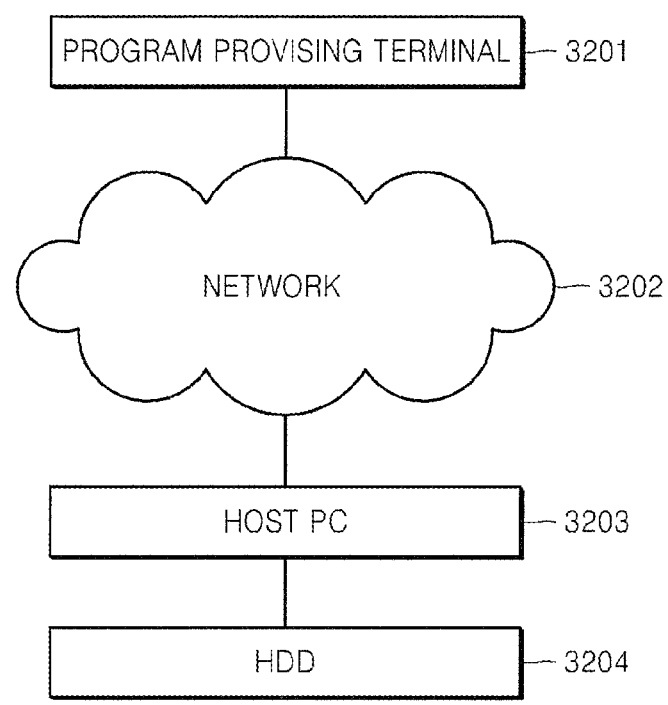
FIG. 32 is a block diagram of a network system illustrated to explain a method of adjusting parameters of a storage device via a network, according to an exemplary embodiment.

Referring to FIG. 32, the network system includes a program providing terminal 3201 a network 3202, a host PC 3203, and a hard disc drive (HDD) 3204.

The network 3202 may be a communications network, such as the Internet.

The program providing terminal 3201 stores a program for adjustment of parameters needed to perform the methods of performing the read/write process on a recording medium having a defect, illustrated in FIGS. 13, 18, and 33.

The program providing terminal 3201 performs a process of transmitting this program to the host PC 3203 connected thereto via the network 3202, in response to a request for the program from the host PC 3203.

The host PC 3203 includes hardware and software that enables the host PC 3203 to be connected to the program providing terminal 3201 via the network 3202 so as to request the program and to download the program from the program providing terminal 3201.

The host PC 3203 allows the HDD 3204 to perform the methods of adjusting parameters of a storage device, illustrated in FIGS. 13, 14, 15, 16, 17 and 18, according to the program downloaded from the Program providing terminal 3201.

Next, a method of adjusting parameters for a recording medium having a defect via a network, according to an exemplary embodiment network, will be described with reference to FIGS. 32 and 33.

First, the host PC 3203 that uses the HDD 3204 as a storage device, is connected to the Program providing terminal 3201 via the network 3202 (operation S701).

After being connected to the Program providing terminal 3201, the host PC 3203 transmits a request for a program for parameter adjustment to the Program providing terminal 3201 (operation S702).

Next, the Program providing terminal 3201 transmits the requested program to the host PC 3203, and the host PC 3203 downloads this program (operation S703).

Then, the host PC 3203 controls the HDD 3204 to execute the downloaded program (operation S704).

Next, a massive defective area is determined in a recording medium (not shown) in the HDD 3204 (operation S705), and information related to the massive defective area is produced (operation S706). Operations 705 and 706 may be performed according to any one of the methods of performing the read/write process on a recording medium, illustrated in FIGS. 13, 14, 15, 16, 17 and 18.

The information related to the massive defective area may include a first parameter representing a logical track length adjusted in the massive defective area and a second parameter representing the location of a logical sector #0 in the massive defective area.

The information related to the massive defective area may further include head information, starting cylinder information of the massive defective area, and ending cylinder information of the massive defective area.

If the width MDD_WIDTH of the massive defective area is adjusted to be equal to the width ZONE_WIDTH of a zone including the massive defective area, information representing the track location in the massive defective area may include the head information and zone information.

Next, the information related to the massive defective area produced in operation S706 is stored in the disc or a nonvolatile memory included in the HDD 3204 (operation S707).

Defect management may be performed on a recording medium in a disc drive according to a program downloaded via a network, as described above.

Exemplary embodiments may be realized as a method, an apparatus, a system, and so on. When an exemplary embodiment is realized as software, the members are code segments which execute necessary operations. Programs or code segments may be stored in a processor readable medium. The processor readable medium may be any medium, such as an electronic circuit, a semiconductor memory device, a random access memory (ROM), a flash memory, an erasable ROM, a floppy disc, an optical disc, or a hard disc.

While exemplary embodiments have been particularly shown and described, it will be understood that various changes in form and details may be made therein without departing from the spirit and scope of the following claims.

What is claimed is:

1. A defective sector detector of a storage device comprising:
    a first servo gain calculator configured to calculate a servo gain for a servo sector on a track of a recording medium of the storage device;
    a buffer configured to store servo gains for each servo sector of the track;
    a second servo gain calculator configured to calculate a servo gain of the track by calculating an average of the servo gains for the servo sectors on the track from the buffer;
    a threshold value calculator configured to calculate a threshold value by multiplying the servo gain of the track by a proportional constant; and
    a defective sector determination unit configured to:
        receive the servo gain for the servo sector from the first servo gain calculator,
        determine whether the servo gain exceeds the threshold value, and
        upon determining that the servo gain exceeds the threshold value, output information indicating a plurality of data sectors included in the servo sector to be defective sectors.

2. The defective sector detector of claim 1, wherein the servo gain for a servo sector is produced in an automatic gain control circuit of a read/write channel of the storage device while reading a region of the track in which servo information is written.

3. The defective sector detector of claim 2, wherein calculating the servo gain for a servo sector comprises calculating an average of servo gains produced in the region.

4. The defective sector detector of claim 1, wherein the plurality of data sectors indicated as being defective are determined to be included in a massive defective area on the recording medium.

5. The defective sector detector of claim 4, wherein a logical track length of the track containing the plurality of data sectors indicated as being defective is adjusted in such a manner that logical block addresses are not assigned to the plurality of data sectors.

6. The defective sector detector of claim 1, wherein the storage device comprises a disc drive.

7. The storage device of claim 1, wherein the servo gain of the servo sector is received by the defective sector determination unit from the buffer.

8. A method comprising steps of:
    calculating a servo gain for each servo sector of a track of a recording medium of a storage device;
    calculating an average servo gain for the track by averaging the servo gains for each servo sector of the track;
    calculating a threshold value by multiplying the average servo gain of the track by a proportional constant greater than 0 and less than 1;
    determining whether the servo gain of each servo sector exceeds the threshold value; and
    upon determining that the servo gain of a servo sector exceeds the threshold value, determining data sectors included in the servo sector to be defective sectors.

9. The method of claim 8, wherein the threshold value comprises a boundary value for successfully performing a read/write process in the storage device.

10. The method of claim 8, wherein the servo gain for a servo sector is generated by an automatic gain control circuit in a section in which a servo signal recorded on the track is reproduced.

11. The method of claim 10, wherein calculating the servo gain for a servo sector comprises calculating an average of servo gains produced in the section.

12. The method of claim 8, wherein the data sectors of the track determined to be defective sectors are included in a massive defective area on the recording medium.

13. The method of claim 8, wherein a logical track length of the track is adjusted in such a manner that logical block addresses are not assigned to the data sectors determined to be defective sectors.

14. A storage device comprising:
    a recording medium comprising a plurality of tracks, each of the plurality of tracks comprising one or more servo sectors;
    a media interface which writes information to, or reads information from, the recording medium by accessing the recording medium;
    a processor which controls the media interface to write data to, or read data from, a target track of the recording medium; and
    a memory containing code objects configured to cause the processor to
        calculate a servo gain for each servo sector of the target track,
        calculate an average servo gain for the target track by averaging the servo gains for each servo sector of the target track,
        calculate a threshold value by multiplying the average servo gain of the target track by a proportional constant greater than 0 and less than 1, determine whether the servo gain of each servo sector exceeds the threshold value, and upon determining that the servo gain of a servo sector exceeds the threshold value, determine data sectors included in the servo sector to be defective sectors.

15. The storage device of claim 14, further comprising a read/write channel, wherein the servo gain for a servo sector is generated by an automatic gain control circuit of the read/write channel in a region of the target track in which servo information is written.

16. The storage device of claim 15, wherein calculating the servo gain for a servo sector comprises calculating an average of servo gains produced in the region.

17. The storage device of claim 14, wherein the data sectors of the target track determined to be defective sectors are included in a massive defective area on the recording medium.

18. The storage device of claim 14, wherein the code objects are further configured to adjust a logical track length of the target track in such a manner that logical block addresses are not assigned to the data sectors determined to be defective sectors.

\* \* \* \* \*